United States Patent [19]

Tsuda et al.

[11] Patent Number: 5,113,224

[45] Date of Patent: May 12, 1992

[54] RECIPROCATING DRIVING DEVICE

[75] Inventors: Tadayuki Tsuda; Kanji Yano; Isao Ikemoto, all of Kawasaki; Kazushi Watanabe, Yokohama; Makoto Tanaka; Kazuhiko Ishiwata, both of Tokyo, all of Japan

[73] Assignee: Canon Kabushiki Kaisha, Tokyo, Japan

[21] Appl. No.: 746,811

[22] Filed: Aug. 15, 1991

Related U.S. Application Data

[63] Continuation of Ser. No. 596,070, Oct. 11, 1990, abandoned.

[30] Foreign Application Priority Data

| Oct. 13, 1989 | [JP] | Japan | 1-265109 |
| Mar. 29, 1990 | [JP] | Japan | 2-78633 |
| Aug. 10, 1990 | [JP] | Japan | 2-213506 |

[51] Int. Cl.⁵ .................................... G03G 15/28
[52] U.S. Cl. .................................. 355/234; 74/27; 74/29
[58] Field of Search ............ 355/234, 235, 233; 358/474, 494; 74/29, 30, 33, 27

[56] References Cited

U.S. PATENT DOCUMENTS

| 3,700,327 | 10/1972 | Murgas et al. | 355/234 |
| 4,116,557 | 9/1978 | Kushima et al. | 355/235 |
| 4,129,374 | 12/1978 | Uchida et al. | 355/234 |
| 4,172,653 | 10/1979 | Bujese | 355/234 |
| 4,319,835 | 3/1982 | Navone | 355/50 |
| 4,403,849 | 9/1983 | Burger et al. | 355/235 |
| 4,530,591 | 7/1985 | Mastuyama et al. | 355/234 |
| 4,660,957 | 4/1987 | Ueda et al. | 355/3 SH |
| 5,001,515 | 3/1991 | Nomura et al. | 355/200 |

FOREIGN PATENT DOCUMENTS

| 62-14641 | 1/1987 | Japan | 355/234 |
| 62-189454 | 8/1987 | Japan | 355/234 |
| 62-205329 | 9/1987 | Japan | 355/234 |
| 63-43617 | 8/1988 | Japan | . |

*Primary Examiner*—R. L. Moses
*Attorney, Agent, or Firm*—Fitzpatrick, Cella, Harper & Scinto

[57] ABSTRACT

A reciprocating driving device is provided with a reciprocating moving member supported to be movable in a predetermined direction and the reverse direction. A first rack is provided on the reciprocating moving member, and a second rack is provided on the reciprocating moving member and arranged so as to face the first rack. A gear moves the reciprocating moving member in the predetermined direction or the reverse direction by rotating in a predetermined direction, selectively meshing with the first rack or the second rack.

29 Claims, 18 Drawing Sheets

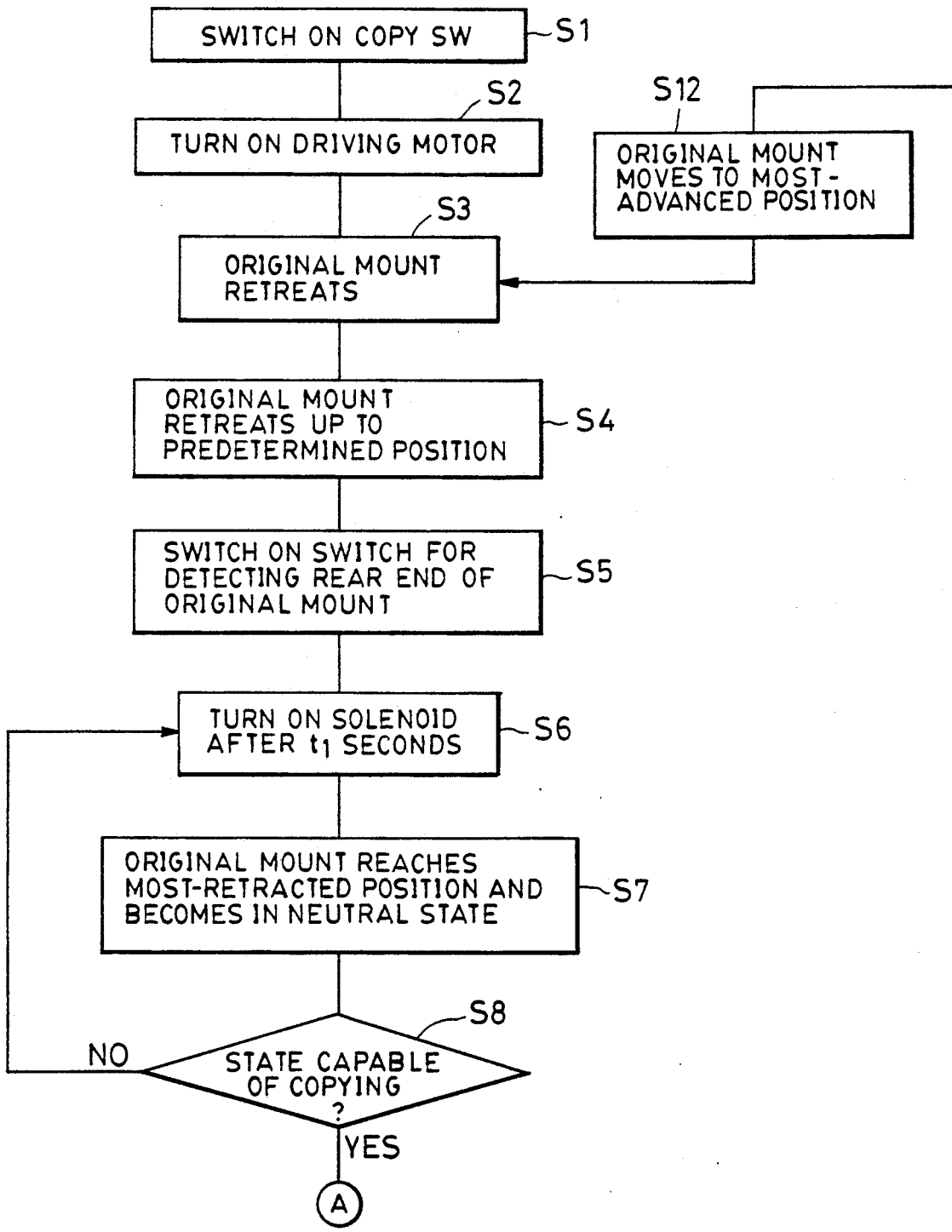

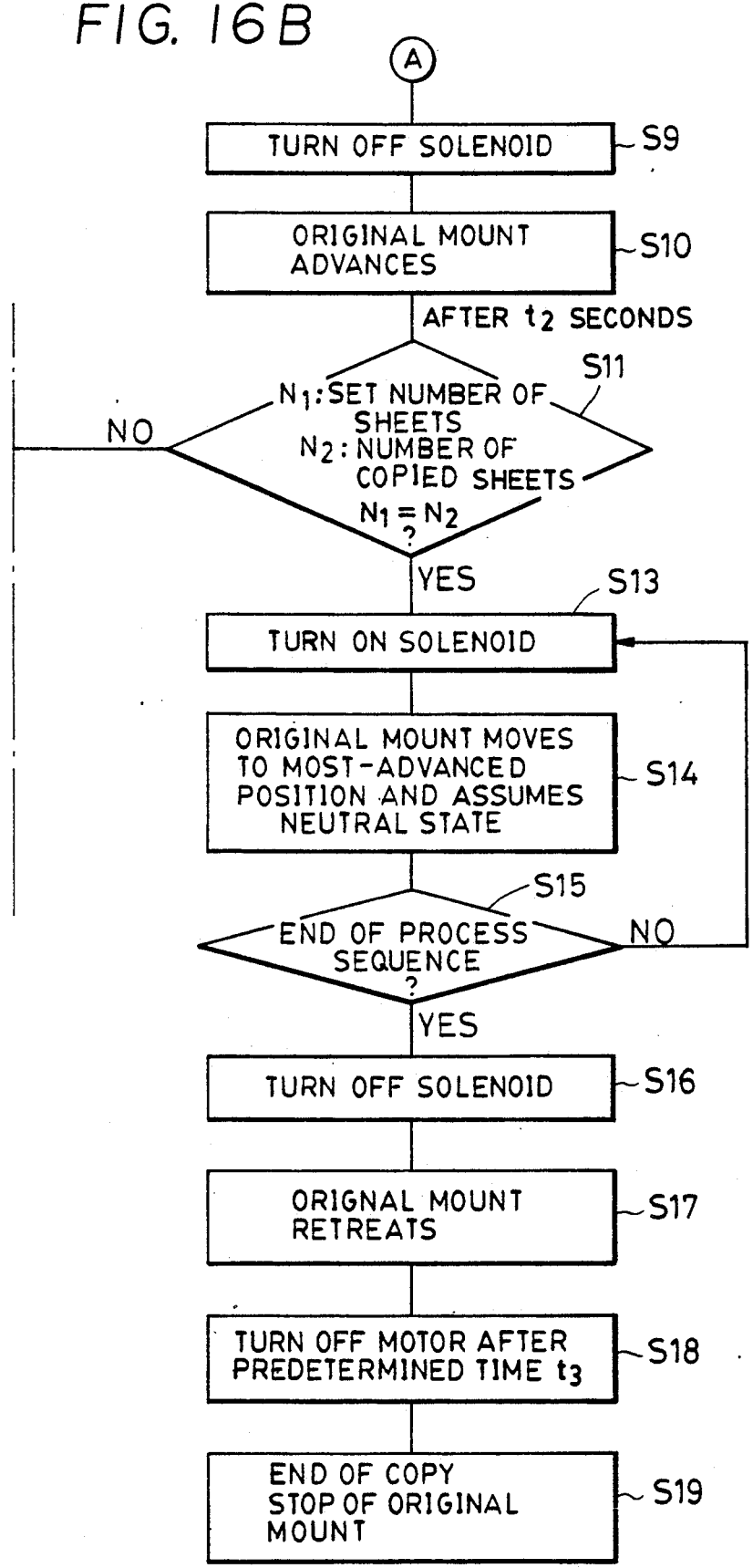

FIRST RACK (RACK FOR ADVANCE)

READ-END PORTION (INTERNAL GEAR)

BUTT PORTION

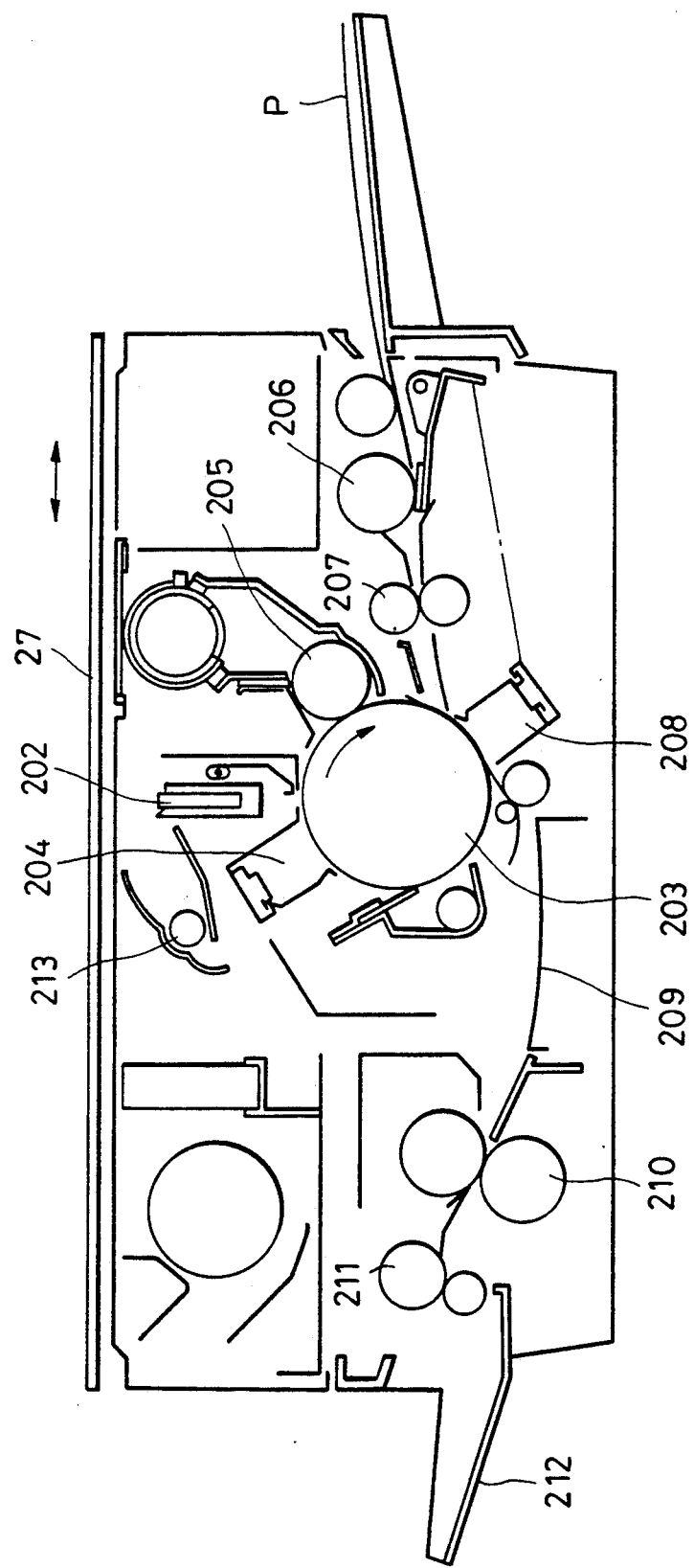

RECIPROCATING DRIVING DEVICE

This application is a continuation of application Ser. No. 07/596.070 filed Oct. 11, 1990. abandoned.

BACKGROUND OF THE INVENTION

1. Field of the Invention

This invention relates to an original-mount-moving-type image forming apparatus, that is, to an image forming apparatus, such as a copier, an image reading apparatus, an image display apparatus or the like, in which an original mount, on which an original is set, is subjected to a reciprocating moving drive (subscanning movement) relative to an original scanning unit (main-scanning unit), such as an original illuminating unit, an image reading unit or the like of the main body of the apparatus. Image formation, image reading or the like is performed during the process of forward movement or backward movement of the original.

The present invention also relates to a reciprocating driving device used, for example, for moving an original mount of a copier, or the like.

2. Description of the Related Art

As an example of a load performing reciprocating movement, there has been disclosed an original mount of a copier as shown in U.S. Pat. No. 4,660,957, a mirror mount or the like. For driving the original mount or the mirror mount, a reciprocating movement, composed of a constant-speed advance movement and a retreat movement, is synchronized with main-body driving for an image carrying member, a feed roller or the like. A mechanism has been used which uses a motor rotating in one direction to provide the reciprocating movement. That mechanism is also used as a driving source for driving the main body. Such a mechanism can comprise two spring clutches for transmitting and interrupting the driving force for advance and retreat movements, one or two solenoids for switching and a gear train are combined (see, for example, Japanese Patent Publication No. 63-43617 (1988)).

However, since spring clutches and solenoids have the following problems, a reciprocating driving device which does not use spring clutches and solenoids has been needed:

(1) A spring clutch has a large number of components. Hence, if variations exist in accuracy of respective components, phenomena such as noise, slippage, spring breakage, and combined rotation occur. Accordingly, it is difficult to control accuracy with respect to the various components.

(2) Since the volume and weight occupied by a spring clutch (a so-called iron mass) are large, the space occupied by the entire driving device becomes large particularly for a small copier. Thus, it is difficult to produce a small copier with an inherently relatively larger spring clutch. Furthermore, the incorporation of high-accuracy components is expensive, thus increasing the cost of such a copier.

(3) When the device is applied to the driving of an original mount of a copier or the like, the capability of providing a neutral state is needed in order to achieve proper synchronism for process conditions such as charging, transfer, fixing and the like, in addition to reciprocating movement.

SUMMARY OF THE INVENTION

The present invention has been made for solving the above-described problems in the prior art.

It is an object of the present invention to provide a reciprocating driving device which performs reciprocating driving without using spring clutches and solenoids by providing a pinion gear revolvable as well as rotatable on its own axis with two racks meshing with it.

The above-described object is accomplished, according to one aspect of the present invention, by a reciprocating driving device for performing reciprocating repeated movement of a moving mount by providing driving means, comprising a pinion gear revolvably supported while rotating on its own axis meshing with a gear having driving means and rotating in one direction, and two racks for advance and retreat provided parellel to a moving direction of the moving mount and within a range of contact when the pinion gear revolves interposing the pinion gear and the center of its revolution, wherein the two racks are fixed on the moving mount leaving at least a space for the pinion gear to revolve and communicate with a rack at the other side behind a rear end of each rack.

By setting $B < A < 90°$, where A is an angle defined by a straight line connecting the center of revolution and the center of the pinion gear and the rack when the pinion gear meshes with one of the racks, and B is an angle defined by the center of revolution and the center of the pinion gear when the center of revolution is arranged on a straight line indicating the direction of the meshing pressure angle between the rack and the pinion gear, the pinion gear securely collides with the rack, and stable drive transmission becomes possible.

The pinion gear can be configured by fixing two gears having different circumferential speeds in parallel. If it is assumed that one of the gears meshes with the rack for forward movement and the other gear meshes with the rack for backward movement, it thus is possible to provide reciprocating movement having different speeds. By virtue of this feature, it is also possible to shorten the time for the movement.

BRIEF DESCRIPTION OF THE DRAWINGS

FIG. 16, consisting of FIGS. 16A and 16B, is a flowchart of the second embodiment;

FIG. 27 is a diagram of a copier to which the above-described first through sixth embodiments can be applied.

DETAILED DESCRIPTION OF THE PREFERRED EMBODIMENTS

An embodiment when a reciprocating driving device according to the present invention is applied to a moving original mount of a copier will now be explained by reference to the drawings.

Figure 1:
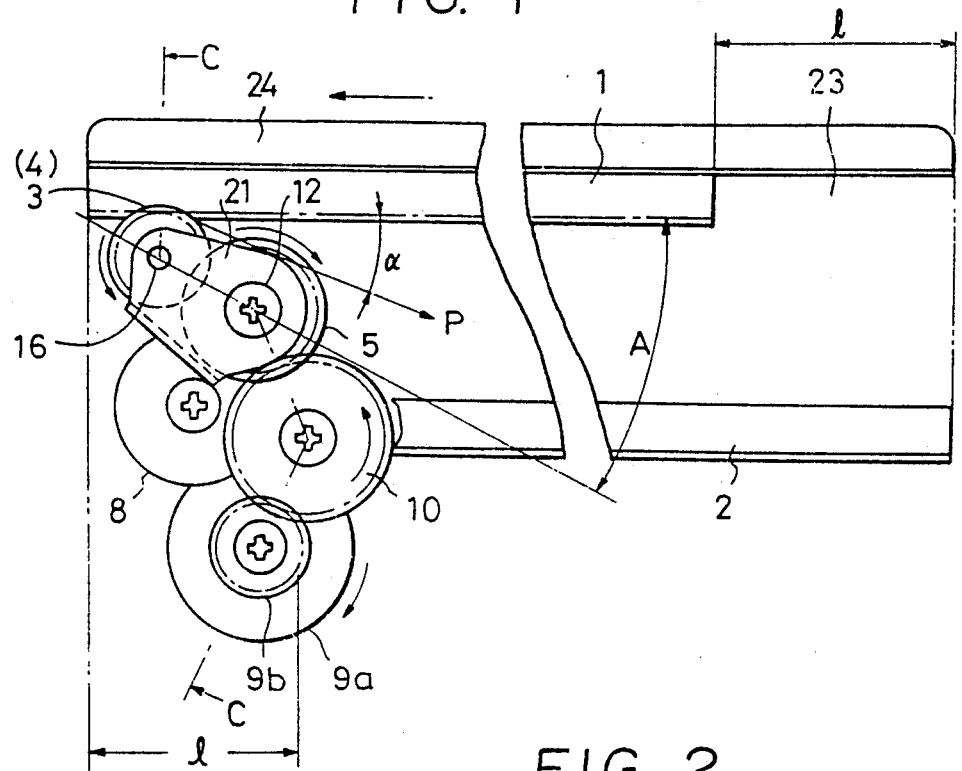
FIG. 1 is a diagram showing a state in which a rack mount of a reciprocating driving device, according to an embodiment of the present invention, is performing advance movement.
Figure 2:
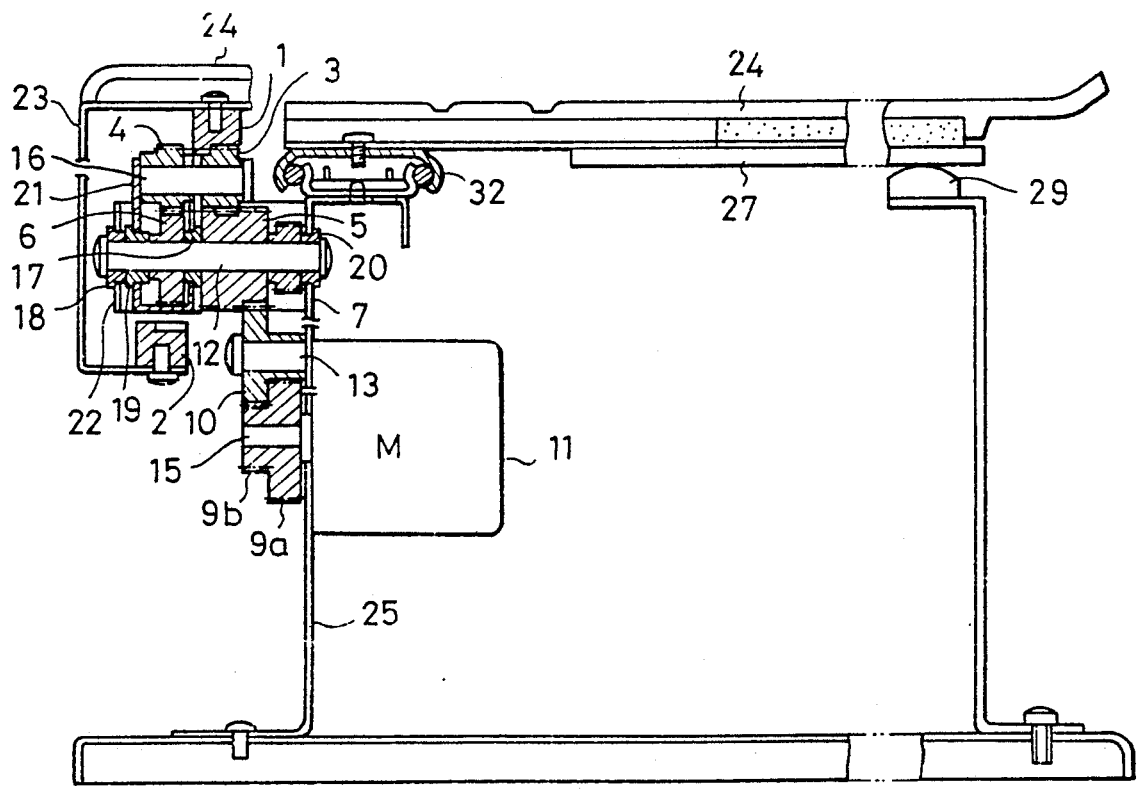
FIG. 2 is a cross-sectional view showing a meshed state, taken along line C—C in FIG. 1.
Figure 3:
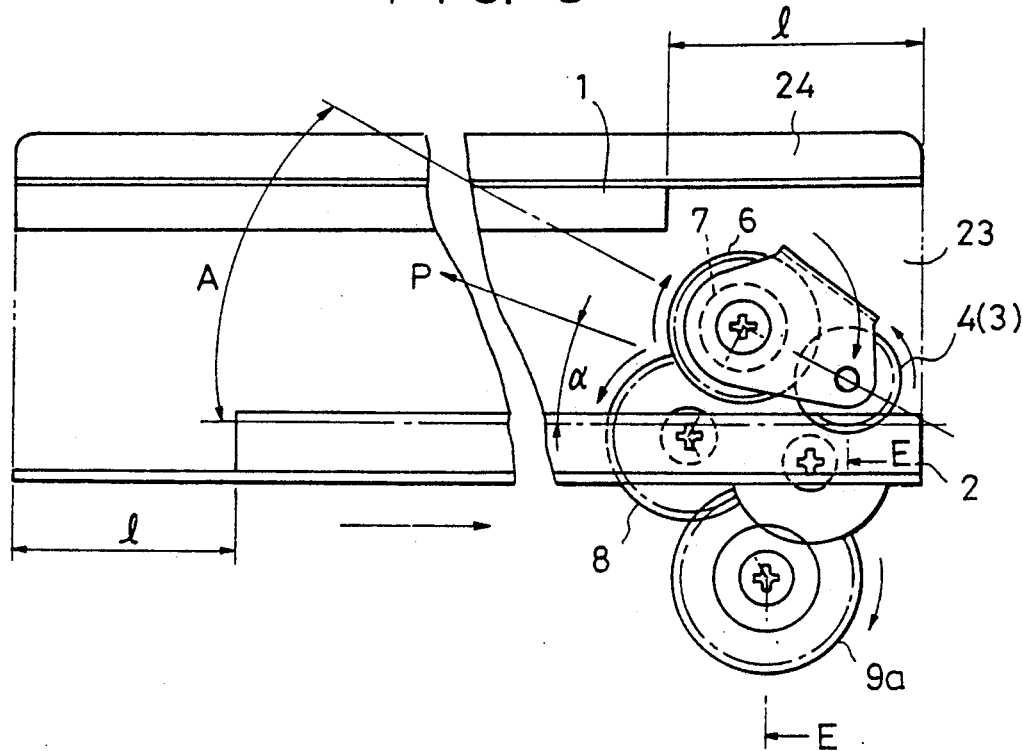
FIG. 3 is a diagram showing a state in which the rack mount is performing retreat movement.
Figure 4:
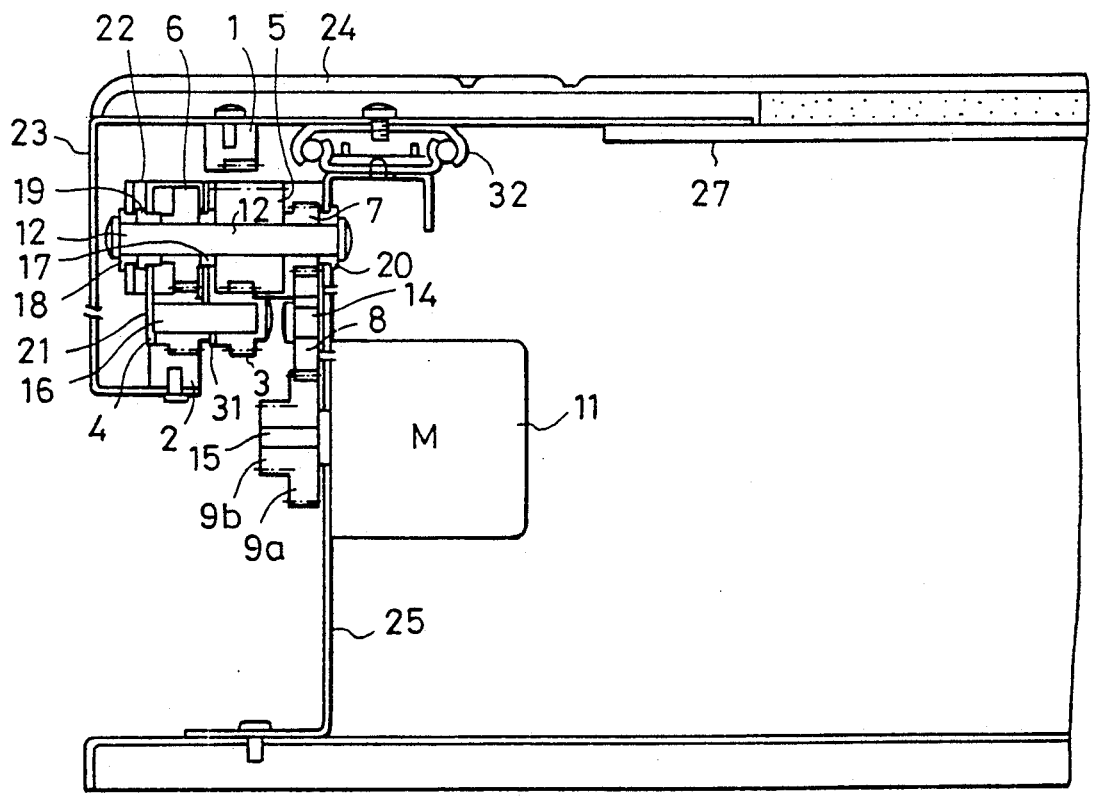
FIG. 4 is a cross-sectional view showing a meshed state, taken along line E—E in FIG. 3.
Figure 5A:
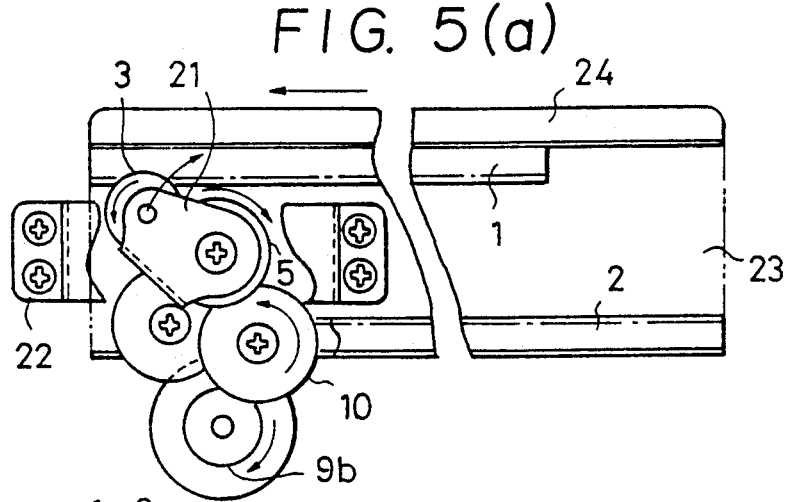
FIGS. 5(a), 5(b), 5(c) and 5(d) are diagrams showing, by a series of movements, how the rack mount performs reciprocating linear movement.
Figure 5B:
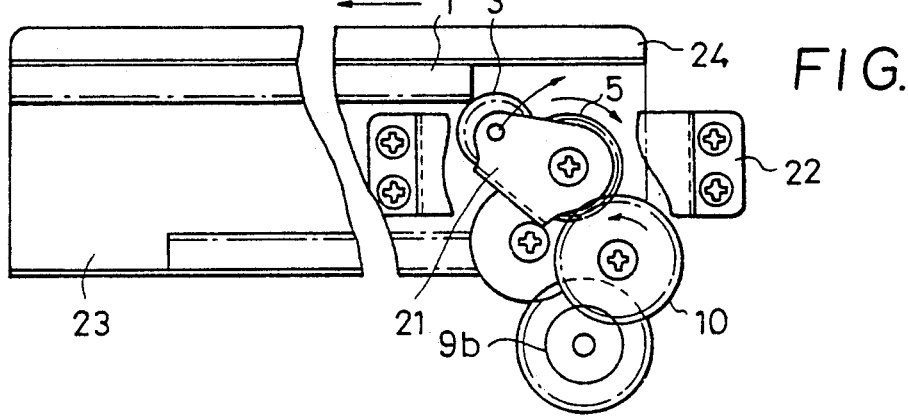
Figure 5C:
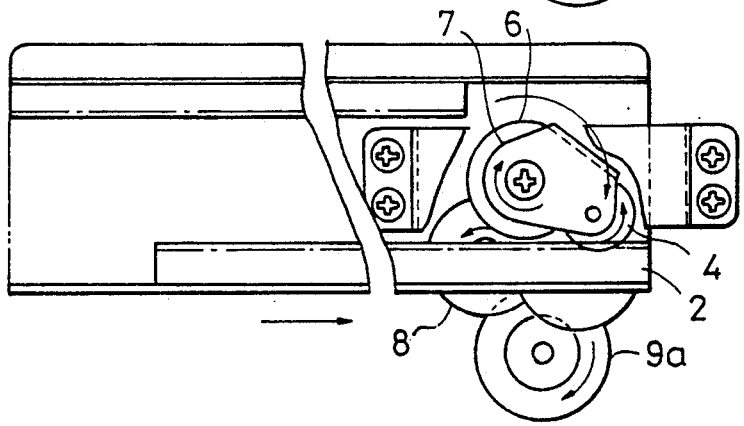
Figure 5D:
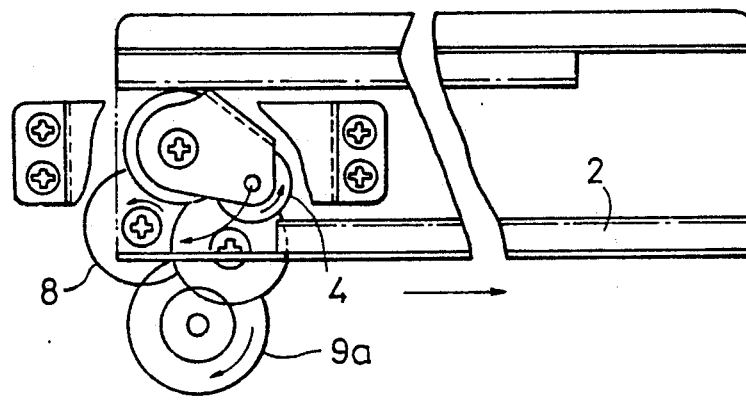

FIG. 1 shows a state in which a rack mount 23 fixed on an original mount, serving as a moving mount, is performing linear movement in the advance (forward) direction. FIG. 2 shows a cross-sectional view of the meshed state taken along line C—C shown in FIG. 1. FIG. 3 shows a state in which the rack mount 23 performs linear movement in the retreat direction. FIG. 4 shows a cross-sectional view of the meshed state taken along line E—E shown in FIG. 3.

Referring to FIGS. 1 and 2, components of the original mount of the copier are composed of original-mount glass 27, plates 24 and 29 for pressing an original, and the rack mount 23 fixing a rack. These components are positioned on a side plate of the main body via a rail 32 so as to be able to perform reciprocating linear movement.

Two racks, that is, a rack 1 for advance movement and a rack 2 for retreat movement are fixed on the rack mount 23 parallel to the moving direction of the original mount and at least within contact range of a pinion gear, which will be described subsequently. The pinion gear rotating on its own axis in one direction and rotatably supported for revolution about a shaft 12 as the center of its revolution, is disposed between the two racks. In the present embodiment, in order to change advance and retreat speeds of the original mount, the pinion gear comprises a gear 3 for advance and a gear 4 for retreat having different numbers of teeth disposed in parellel, and is supported so as to be rotatable around a shaft 16.

The device is arranged so that the pinion gears 3 and 4 mesh with the rack 1 for advance and the rack 2 for retreat, respectively.

An explanation will now be provided in detail of a configuration to make the pinion gears 3 and 4 rotate about their own axes as well as revolve. Shaft 12, serving as the center of revolution for the pinion gears 3 and 4, is rotatably supported on a side plate 25 of the main body of the apparatus and a supporting plate 22 via bearings 18 and 20. A rotating plate 21, rotatably supported via bearings 17 and 19, is provided on shaft 12. Rotation shaft 16, around which pinion gears 3 and 4 are rotatably mounted, is fixed on rotating plate 21. By thus disposing rotating plate 21, the pinion gears 3 and 4 become revolvable around shaft 12. Behind the rear end of rack 1 for advance is provided a space where pinion gears 3 and 4 can revolve. For that purpose, rack 1 for advance is made shorter by length l than rack 2 for retreat, at its rear-end portion. The same arrangement is provided for the rack 2 for retreat (see FIG. 3).

Next, the configuration for driving the pinion gears 3 and 4 will be explained. On the shaft 12, a gear 5 is rotatably supported, and gears 6 and 7 are fixed. Pinion gear 3 meshes with gear 5, and pinion gear 4 meshes with gear 6. The driving force of a motor 11, serving as driving means, is transmitted to gear 5 via gears 9b and 10, and to gear 6 via gears 9a, 8 and 7. Hence, pinion gears 3 and 4 receive a driving force to rotate on their own axes in accordance with the rotation of gears 5 and 6 (see FIG. 4).

In the present embodiment, as is apparent from the drawings, the device is set so that gears 5 and 6 receive a rotation force in the clockwise direction. As a result, the pinion gears 3 and 4 receive a driving force to rotate about their own axes in the counterclockwise direction, and also receive a moment force in the clockwise direction due to pressure applied on the surfaces of their meshing teeth. This moment force becomes a driving force to revolve pinion gears 3 and 4. In order to obtain a secure moment force, a frictional-resistance member 31 is inserted between pinion gear 3 for advance and rotating plate 21.

The operation during advance movement of the reciprocating driving device having the above-described configuration will be explained by reference to FIGS. 1, 2 and 5. The driving force of the motor 11 is transmitted to pinion gear 3 for advance via gear 9b for advance fixed on the motor's output shaft, gear 10 and gear 5. The direction of rotation at this time is as shown in the drawings. Because of the above-described moment force, the pinion gear 3 for advance contacts the rack 1 for advance movement. At this time, rack 1 for advance movement is situated at a position not meshing with pinion gear 4 for retreat. In this state, pinion gear 3 meshes with rack 1 for advance, and rack mount 23 starts to perform advance linear movement in the direction of the arrow (see FIG. 5(a)). If rack mount 23 continues advance movement and pinion gear 3 reaches the end of rack 1 for advance movement (see FIG. 5(b)), pinion gear 3 leaves rack 1, and pinion gears 3 and 4 start to revolve as described above. The revolution is continued until pinion gear 4 for retreat movement contacts rack 2, the surface of teeth of rack 2 faces the surface of teeth of the pinion gear 4, interposing the center of revolution (see FIG. 5(c)). Subsequently, a retreat operation (to be described later) is started.

Next, the operation during retreat will be explained by reference to FIGS. 3, 4 and 5. The driving force of motor 11 is transmitted from gear 9a, fixed on the motor's output shaft, to gear 7, fixed on shaft 12, via gear 8. The driving force is also transmitted to pinion gear 4 for retreat movement via gear 6 fixed on shaft 12. The directions of rotations at this time are as shown in the drawings. The subsequent retreat movement of rack mount 23 is the same as in the case of the above-described advance movement (see FIG. 5(c)). During retreat, pinion gear 3 is situated at a position not meshing with rack 2. If rack mount 23 continues retreat movement and pinion gear 4 reaches the end of rack 2, pinion gear 4 leaves rack 2 and revolves (see FIG. 5(d)). Pinion gear 3 then communicates with rack 1. Subsequently, rack mount 23 repeats advance and retreat operations in the same manner.

Figure 6:
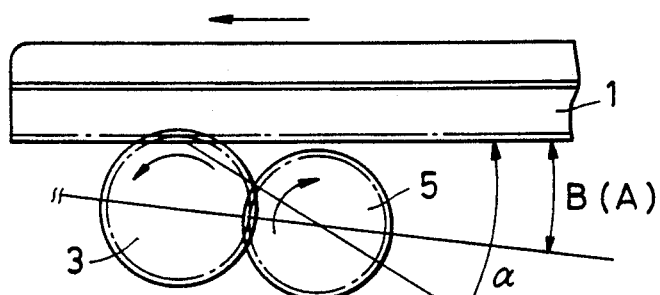
FIGS. 6 through 8 are diagrams illustrating positional relationships between a rack and a pinion.
Figure 7:
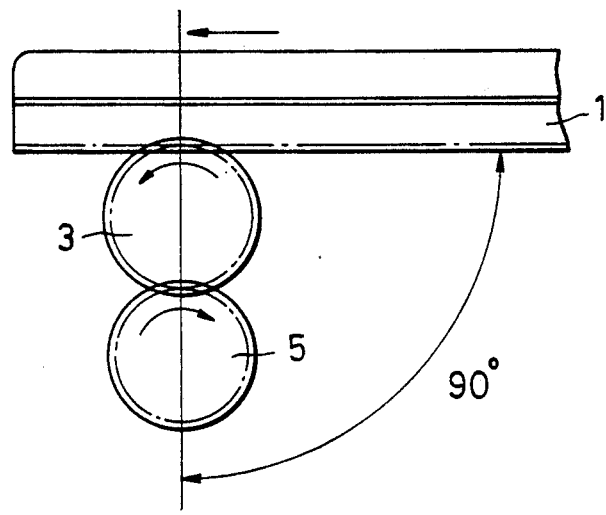

An explanation will now be provided of a desirable relation between either one of the pinion gears 3 and 4 and a rack. When a pinion gear meshes with a rack, a load from the rack is applied on the surface of the gear's meshing teeth. This load functions in the direction of pressure angle $\alpha$ of the gear. By setting $B<A<90°$, where A is an angle defined by a straight line connecting the center of rotation and the center of revolution of the pinion gear meshes with one of the racks, and B is an angle defined by the center of the pinion gear when the center of revolution is arranged on a straight line indicating the direction of the meshing pressure angle between the rack and the pinion, as shown in FIG. 6. As shown in FIG. 7, a moment force is applied on the pinion gear in accordance with the degree of meshing in the direction of mesh with the rack. Hence, the driving force can be securely transmitted to the pinion gear without being freed from the rack once the pinion gear meshes with the rack.

The specifications of the gears used in the device of the present embodiment are summarized in Table 1.

TABLE 1

| Gear No. | Module | Number of teeth | Shift position |
|---|---|---|---|
| Advance | | | |
| 9b (driving gear) | 0.8 | 16 (teeth) | 0 |
| 10 | 0.8 | 28 | 0 |
| 5 | 0.8 | 24 | 0 |
| 3 (pinion gear) | 0.8 | 16 | 0 |
| 1 (rack gear) | 0.8 | — | 0 |
| Retreat | | | |
| 9a (driving gear) | 0.8 | 32 | 0 |
| 8 | 0.8 | 26 | 0 |
| 7 (fixed to shaft 12) | 0.8 | 16 | 0 |
| 6 (fixed to shaft) | 0.8 | 28 | 0 |
| 4 (pinion gear) | 0.8 | 16 | 0 |
| 2 (rack gear) | 0.8 | — | 0 |

| Gear No. | Diameter of pitch circle | Speed of rotation | Linear speed on pitch circumference |
|---|---|---|---|
| Advance | | | |
| 9b | $\phi$ 12.8 (mm) | 30 (rpm) | 20.1 (mm/sec) |
| 10 | $\phi$ 22.4 | 17.14 | 20.1 |
| 5 | $\phi$ 19.2 | 20 | 20.1 |
| 3 | $\phi$ 12.8 | 30 | 20.1 |
| 1 | $\infty$ | — | 20.1 |
| Retreat | | | |
| 9a | $\phi$ 25.6 | 30 | 40.2 |
| 8 | $\phi$ 20.8 | 36.92 | 40.2 |
| 7 | $\phi$ 12.8 | 60 | 40.2 |
| 6 | $\phi$ 22.4 | 60 | 70.4 |
| 4 | $\phi$ 12.8 | 105 | 70.4 |
| 2 | $\infty$ | — | 70.4 |

If it is assumed that the speed of rotation of the motor is 30 rpm, the speed of the rack for advance becomes 20.1 mm/sec, and the speed of the rack for retreat becomes 70.4 mm/sec.

Figure 8:
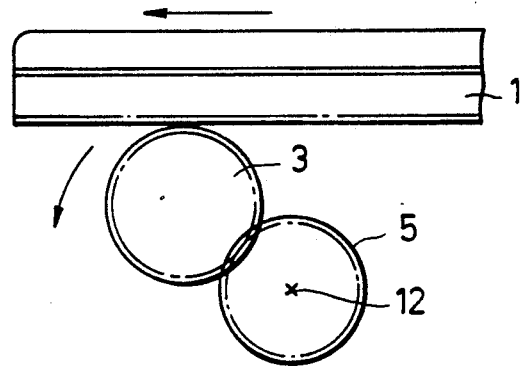

Finally, an explanation will be provided of FIG. 8. FIG. 8 shows a state in which pinion gear 3 stops while meshing with rack 1 for advance. When the gear and rack have thus stopped while meshing with each other and subsequently a need to move the original mount occurs, pinion gear 3 revolves in the counterclockwise direction around the shaft 12 and leaves the rack 1 if the original mount is moved in the advance direction (the direction shown by the arrow) manually. Hence, the original mount can be freely moved manually in either the advance or retreat direction.

Although an explanation has been provided of the device of the embodiment shown in the drawings, the present invention is not limited to the present embodiment. Although advance and retreat speeds different from each other are used particularly in the above-described embodiment, it is also possible to make advance and retreat speeds identical. In that case, there is no need to use a two-staged pinion gear as described above. Referring to FIGS. 2 and 4, pinion gear 4 for retreat, gear 8 and gears 7 and 6 become unnecessary, and it is only necessary to move rack 2 for retreat to a position meshing with the pinion gear 3 for advance. Hence, the configuration becomes simpler. Furthermore, by adopting a configuration in which the driving gear 9 of the main motor 11 also functions as a driving source for paper-feed, image carrying member and the like in the main body, it becomes easier to synchronize the moving speed of the original mount during advance.

Although reciprocating movement of an original in a copier or the like has been illustrated, the device of the present embodiment can also be used as a driving device for other kinds of reciprocating movements, such as a scanner for a printer and the like.

A second embodiment of the present invention will now be explained.

Figure 9:
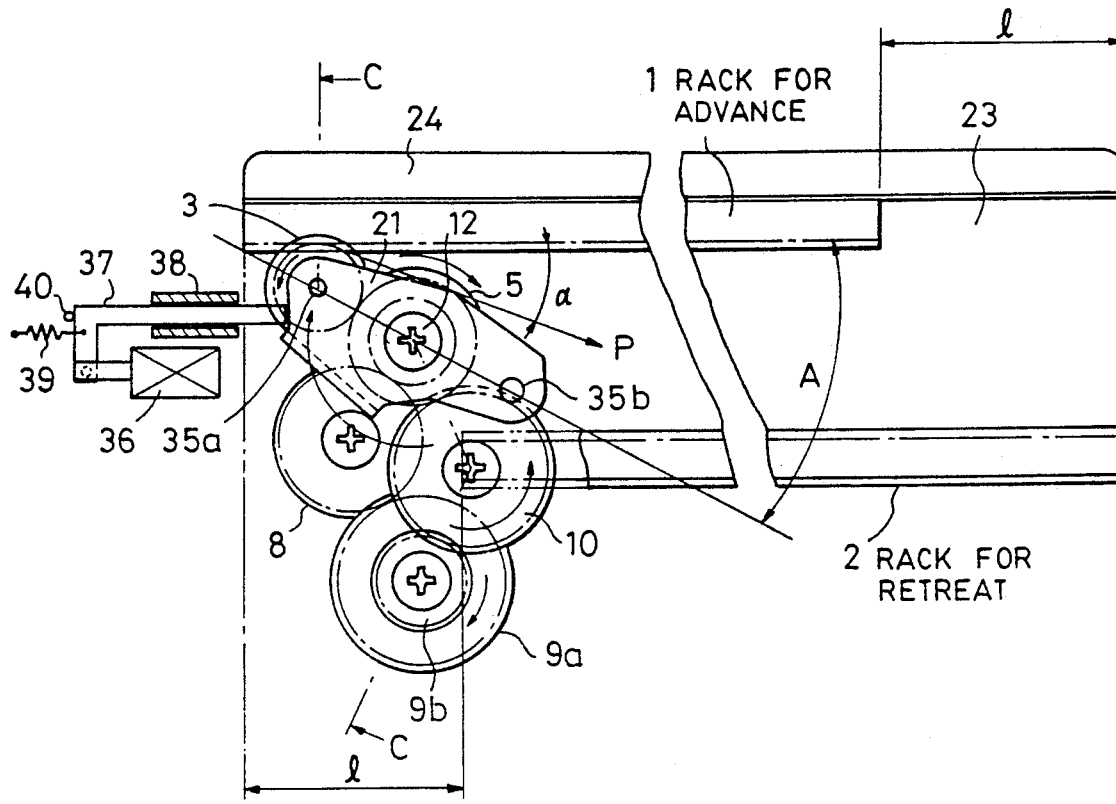
FIG. 9 is a diagram illustrating a state in which a rack mount of an original mount is performing linear movement in the advance direction according to a second embodiment of the present invention.
Figure 10:
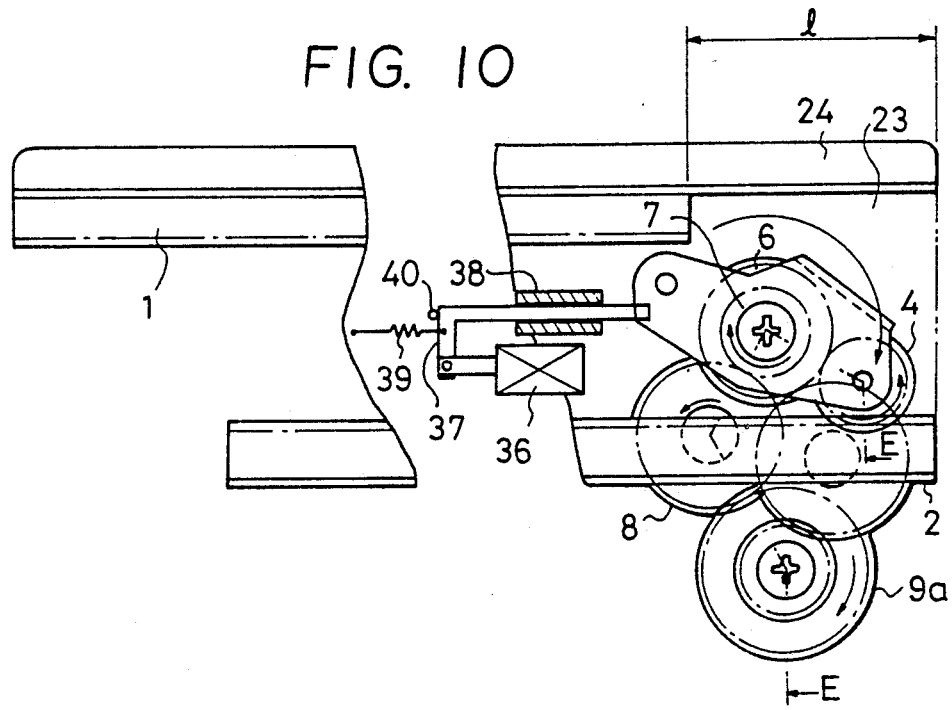
FIG. 10 is a diagram illustrating a state in which the rack mount of the original mount is performing linear movement in the retreat direction.
Figure 11:
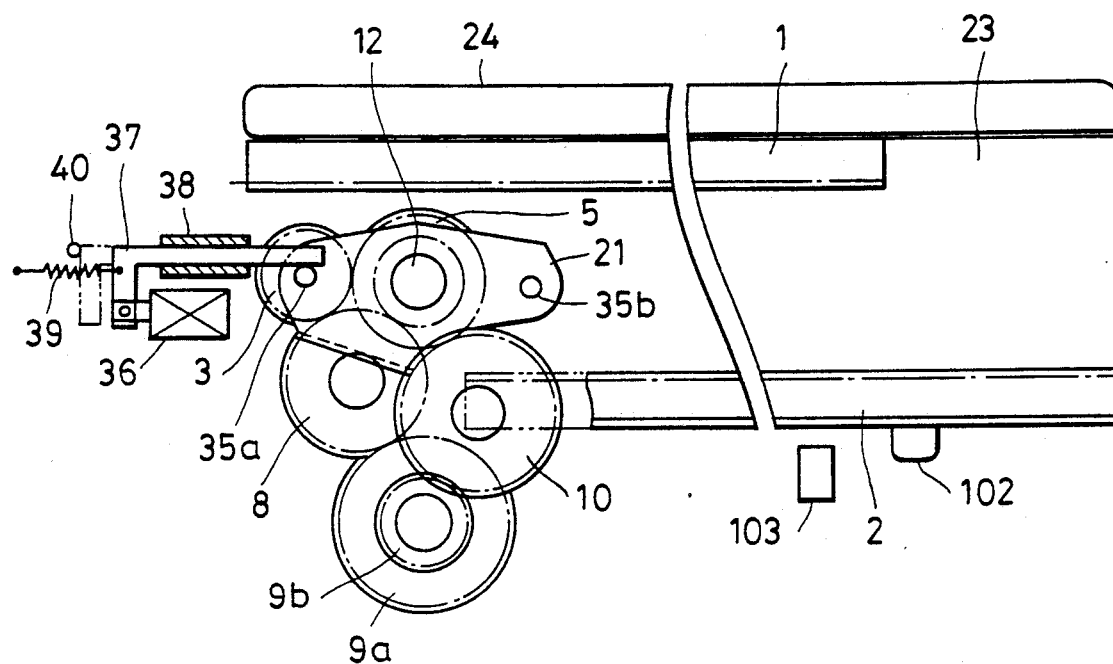
FIGS. 11 and 12 are diagrams illustrating the neutral states.
Figure 12:
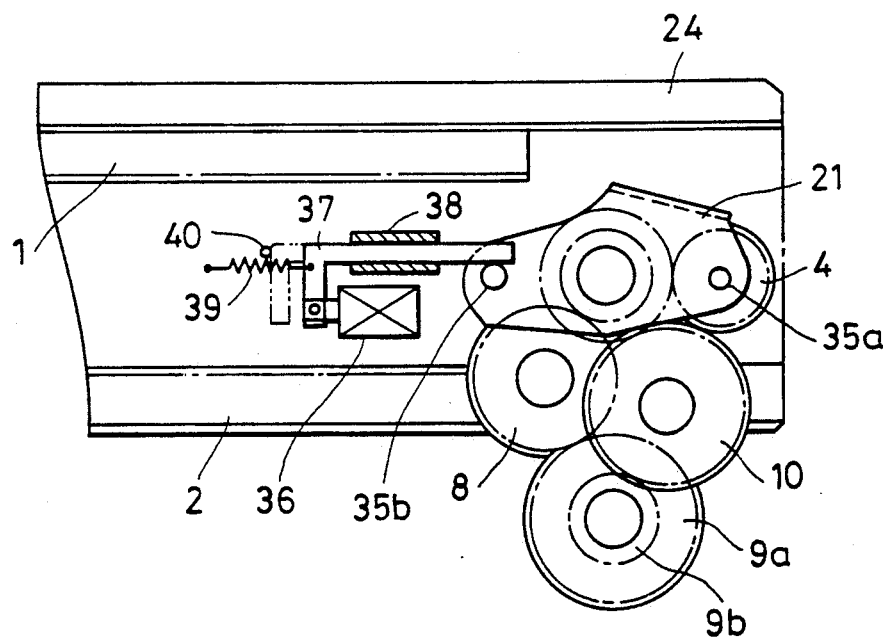
Figure 13:
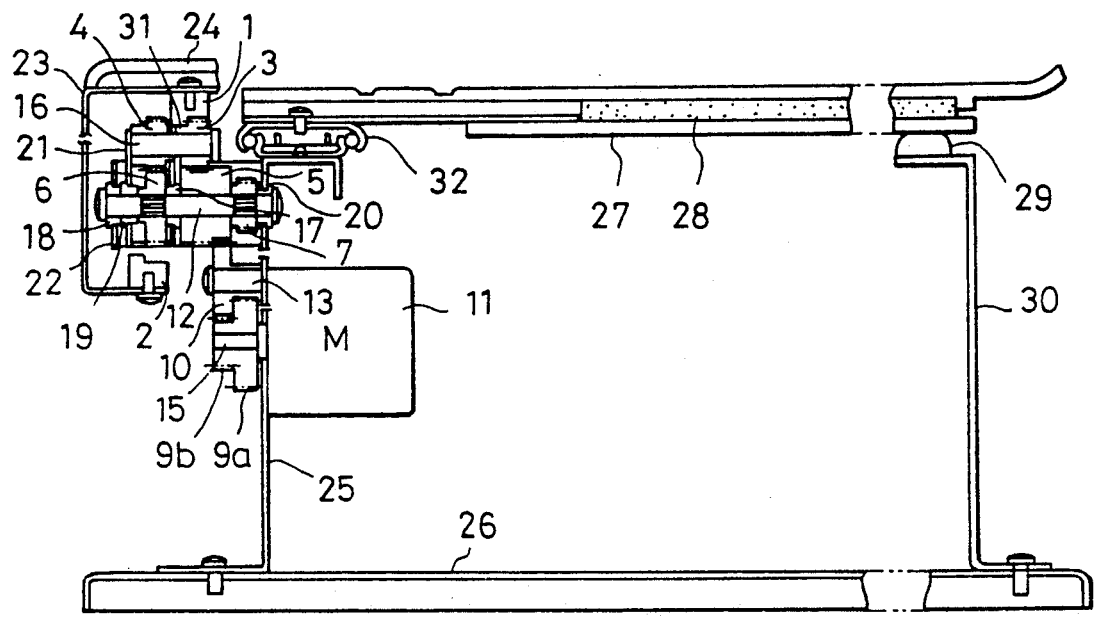
FIG. 13 is a cross-sectional view taken along line C—C in FIG. 9.
Figure 14:
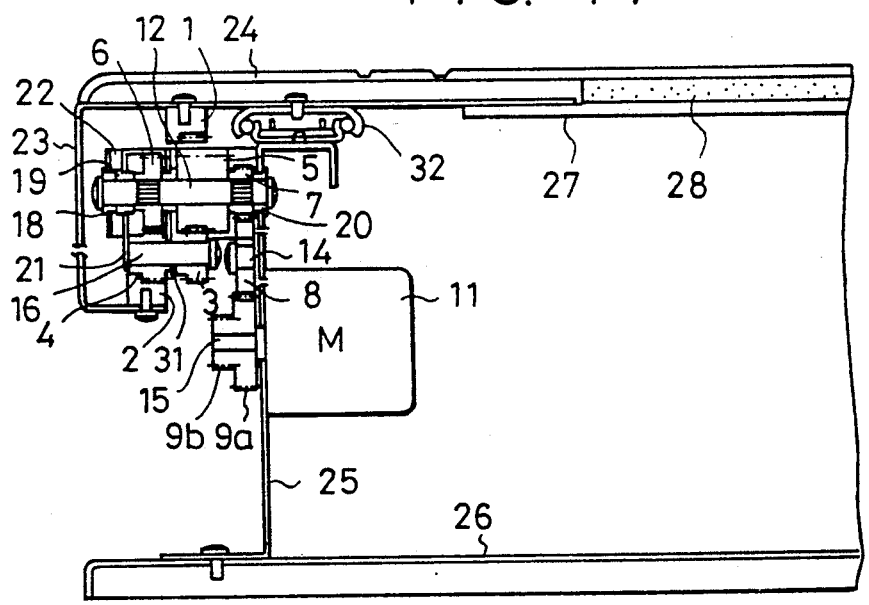
FIG. 14 is a cross-sectional view taken along line E—E in FIG. 10.

FIGS. 9–20 represent the second embodiment of the present invention, and illustrate an original-mount driving device for a copier. FIG. 9 shows a state in which a rack mount 23, which is a component of the original mount, performs linear movement in the advance direction. The cross section of that state, taken along line C—C, is shown in FIG. 13. FIG. 10 shows a state in which rack mount 23 performs linear movement in the retreat direction. The cross section of that state, taken along line E—E, is shown in FIG. 14. FIGS. 11 and 12 show the neutral states.

In general, components of an original mount of a copier are composed of an original-mount glass, a plate for pressing an original, and a rack gear, which are positioned on a side plate of the main body via a rail so that reciprocating linear movement is possible. The original mount performs linear movement by meshing of a rack with a pinion gear performing rotating movement. On rack mount 23 in the present embodiment, two racks, that is, a rack 1 for advance and a rack 2 for retreat, are fixed with the surfaces of respective teeth facing each other. A pinion gear, rotating between the two racks in one direction, revolves around a shaft 12 to alternately mesh with the two racks and repeat reciprocating movement (advance and retreat). In order to change advance and retreat speeds of the original mount, the device is configured so that a pinion 3 for advance and a pinion 4 for retreat having different rotation speeds are disposed for parallel rotation, about the same shaft. Pinion gear 3 for advance meshes with the rack 1 for advance during advance movement, as shown in FIG. 9, and pinion gear 4 for retreat meshes with rack 2 for retreat during retreat movement, as shown in FIG. 10. The operation of the configuration will now be explained.

Pinion gear 3 for advance and pinion gear 4 for retreat are rotatably fitted on a shaft 16 fixed to a rotating plate 21 supported for rotation around shaft 12 via bearings 19 and 20. Hence, the pinion gears for advance and retreat can revolve around the shaft 12. Shaft 12 is rotatably supported on a side plate 25 and a supporting plate 22 via bearings 19 and 20. A gear 5 is rotatably fitted, and gears 6 and 7 are fixed on shaft 12. Pinion gear 3 for advance and pinion gear 4 for retreat mesh the gears 5 and 6, respectively. When gears 5 and 6 rotate in the clockwise direction, the pinion gear rotates. At that time, receiving the action of rotation moment due to the pressing force applied on the surface of the meshing teeth, the pinion gear tries to revolve in the clockwise direction via the rotating plate 21. A frictional-resistance member is inserted between the pinion gear 3 for advance and the rotating plate 21 in order to securely obtain the needed moment force.

In such a configuration, the mechanism of advance and retreat movements of the original mount is the same as in the above-described first embodiment.

If it is assumed that the speed of rotation of the driving gear 9 is 30 rpm, the speed of the rack 1 for advance becomes 20.1 mm/sec, and the speed of the rack 2 for retreat becomes 40.2 mm/sec. Hence, it is possible to change the reciprocating speeds in advance and retreat movements.

Next, an explanation will be provided of the interruption (a neutral state) of power transmission by reference mainly to FIGS. 11 and 12. In FIG. 11, the rotating plate 21 is stopped by passing current through a solenoid 36 before swtching from a retreat state to an advance state. In FIG. 12, the rotating plate 21 is stopped by passing current through the solenoid 36 before switching from an advance state to a retreat state. Thus, neutral states are provided in both cases.

A slide lever 37 is always biased counterclockwise (as shown in FIGS. 11 and 12) by a spring 39, and communicates with an anchoring pin 40. The slide lever 37 has one end loosely fitted with and mounted in a guide 38 so as to be movable to the right and to the left. The other distal-end portion of the slide lever 37 engages with a small solenoid 36. When current is passed through solenoid 36, lever 37 moves to the right (clockwise) in opposition to spring 39. Guide 38 and solenoid 36 are fixed to a driving side plate (not shown). The first (right) end portion of slide lever 37 is close to rotating plate 21. When current flows through solenoid 36, the right end portion of slide lever 37 moves up to a position where it is capable of contacting a central shaft 35a or a pin 35b, depending on the position of rotating plate 21. Central shaft 35a protrudes from rotating plate 21 by such a length as to be able to contact the slide lever 37. Pin 35b is provided at a position having point-symmetrical relation with the shaft 35a with respect to the shaft 12. Conditions for turning on and off the solenoid 36 differ according to the specifications and configuration of the copier. The following cases are usually considered. That is, there are cases in which: the rise time for a light source (particularly, a fluorescent lamp) is long; the rise time for a fixing unit is long; paper is not fed; timings for high-voltage switching for transfer, charging and the like do not synchronize with one another; time is needed for cleaning of a photosensitive member and the like.

Figure 15:
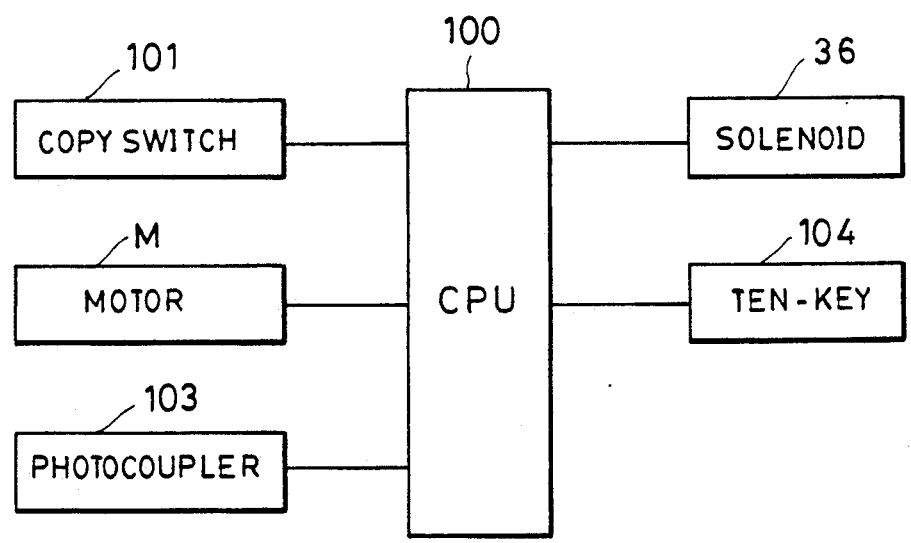
FIG. 15 is control block diagram of the second embodiment.

FIG. 15 is a block diagram of circuitry of the present embodiment. In FIG. 15, there are shown a CPU 100 serving as a control means, and a copy switch 101 for starting a copying operation. A photocoupler 103 for detecting that the original mount situated at a predetermined position near the advance or retreat position is mounted on a fixing member of the main body of the copier. The photocoupler detects that a projection 102, formed on the rack mount 23, interrupts a path between a light-emitting device and a photosensor of the photocoupler. A ten-key 104 (input means) is used by the operator to set the number of sheets in order to continuously copy a plurality of sheets ($N_1$ sheets).

Next, an explanation will be provided of the operation of the embodiment according the flowchart shown in FIGS. 16a and 16b.

When the copy switch 101 is switched on at step S1, motor M starts to rotate at step S2. At that time, the original mount is situated at its home position, and pinion gear 4 for retreat meshes with the rack 2 for retreat. Pinion gear 4 for retreat is rotatably driven by the rotation of the motor M, and the original mount retreats (step S3). When the original mount has retreated to a predetermined position (step S4), the projection 102, formed on rack mount 23, interrupts the path between the light-emitting device and the photosensor of the photocoupler 103, thus detects that the end of the original mount is situated at the predetermined position (step S5). When photocoupler 103 has detected that the original mount has approached the most-retreated position for shifting from retreat to advance, the solenoid 36 is turned on after $t_1$ seconds, thereby moving the slide lever 37 to an anchoring position (step S6). Subsequently, when the original mount has retreated to the most-retreated position, the pinion 4 for retreat is detached from the rack 2 for retreat, and starts to revolve in the clockwise direction around the shaft 12. When the central shaft 35a has contacted the slide lever 37, revolution is stopped, to provide a neutral state (step S7). The apparatus waits in that state until processes of the optical system, developing unit, fixing unit and the like of the copier assume the proper states for copying (step S8).

When the apparatus is ready for copying, the solenoid 36 is turned off at step S9, causing the slide lever 37 to be retracted in the retreat direction, and pinion gear 4 and the pinion gear 3 to revolve again. The pinion gear 3 for advance revolves until it meshes with rack 1 for advance. Subsequently, the driving force of motor M is transmitted to rack 1 to advance the original mount (see FIG. 9). In accordance with the advance movement of the original mount, an original on the original mount is exposed at a predetermined exposure position, and an image of the original is copied on a sheet. After the copying process, the number $N_2$ of copied sheets is compared to the set number of sheets $N_1$ entered in ten-key 104. If there is a difference, the original mount is moved up to the most-advanced position (step S12). The pinion gear 3 for advance is detached from the rack 1 and revolves away from rack 1, the pinion 4 for retreat meshes with the rack 2 for retreat, and the original mount retreats (see FIG. 10). The process then returns to step S3, and the same operations are repeated. When $N_2 = N_1$, solenoid 36 is turned on at step S13 to move the slide lever 37 to the anchoring position. When the original mount has moved up to the most-advanced position, pinion gear 3 for advance is detached from rack 1 and revolves away from rack 1. If pin 35b engages with slide lever 37 to prevent revolution, a neutral state is provided (step S14, also see FIG. 12). If it has been determined at step S15 that the process sequence has ended, the solenoid 36 is turned off, and the slide lever 37 is moved to a non-anchoring position to allow again the revolution of pinion gears 3 and 4. Pinion gear 4 for retreat then meshes with rack 2 to retract the original mount (step S17; also see FIG. 10). After a predetermined time $t_3$ necessary to move the original mount to the home position after turning off solenoid 36 has elapsed, the motor M is turned off (step S18). The original mount stops at a predetermined home position, and the copying operation is ended (step S19).

Although, in the above description, an explanation has been provided of a case in which the two racks are arranged in a vertical positional relationship and a slide lever is used as the lever for providing a neutral state by arresting the rotating plate, a rotating-type lever may also be used.

A third embodiment of the present embodiment will now be explained by reference to FIGS. 17 and 18, in which two racks are arranged in a front-and-rear positional relationship and a rotating-type lever is used as the lever for providing a neutral state.

Figure 17:
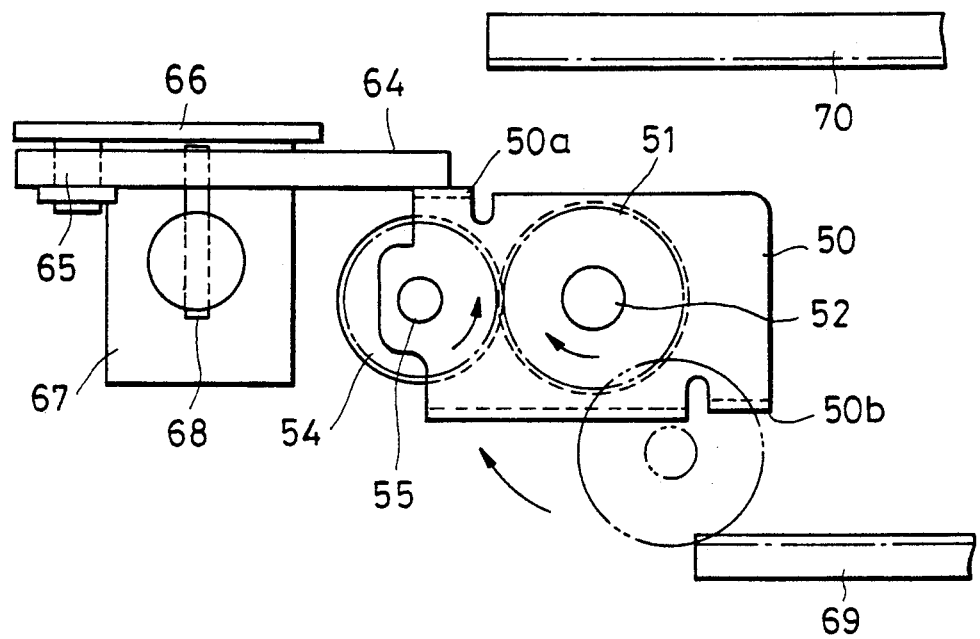
FIG. 17 is a plan view of a third embodiment of the present invention.
Figure 18:
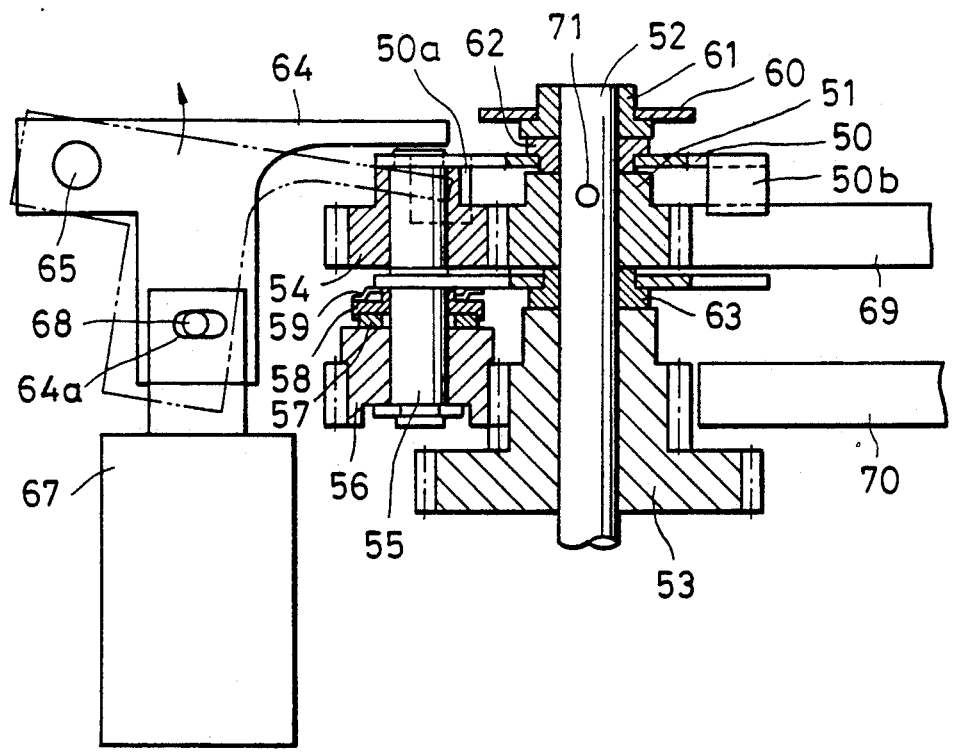
FIG. 18 is a partial cross-sectional view of the third embodiment.

FIG. 17 is a plan view illustrating a state in which the rack for advance is arranged in the front side, the rack for retreat is arranged in the rear side, and the surfaces of teeth of the racks are arranged toward the inner side. FIG. 18 is a partial cross-sectional view for illustrating the state shown in FIG. 17.

The surfaces of teeth of a rack 69 for advance and a rack 70 for retreat are arranged toward the inner side, interposing a pinion gear 54 for advance and a pinion gear 56 for retreat. Racks 69 and 70 are mounted on a rack mount (not shown), which advances or retreats when either rack 69 or 70 meshes with pinion gear 54 for advance or pinion gear 56 for retreat, respectively. When switching from the advance state of movement to the retreat state of movement, a rotating lever 64 operated by a solenoid 67 (to be described later) can be used to prevent the rotation of a rotating plate 50, thus providing a neutral state. The upper end of a shaft (central shaft for revolution) 52 is rotatably supported by a bearing 61, and the lower end of shaft 52 is rotatably supported by bearings (not shown). Shaft 52 is rotated in one direction by a gear (not shown), and a gear 51 is rotated in the clockwise direction (in FIG. 17) via a pin 71. A gear 53 (for retreat) rotates freely relative to the shaft 52, and is rotated in the clockwise direction (in FIG. 17) by a gear (not shown). A pinion shaft 55 is vertically fixed to the rotating plate 50, and the pinion gear 54 for advance and the pinion gear 56 for retreat are loosely fitted on the pinion shaft 55. A friction pad 57 slidably contacts a side of the pinion gear 56 for retreat, and a constant pressure is applied on the friction pad 57 by a thrust weight 58 and a spring 59. Accordingly, when gear 53 rotates, pinion gear 56 for retreat also rotates, to produce a frictional load on the side of the gear 56. As a result, a rotational force in the clockwise direction is always produced for the rotating plate 50.

Rotating lever 64 is loosely fitted for rotation about a pin 65 secured on a side plate 66, and is biased in the counterclockwise direction by a spring (not shown). The rotating distal end of the rotating lever 64 can be set in either position (shown by two-dot chain lines) contactable with folded portions 50a and 50b for the purpose of stopping the rotating plate 50 or a non-contact position (shown by solid lines), by solenoid 67. A long hole 64a is provided at a central lower-end portion of the rotating lever 64, and an operation pin 68 of solenoid 67 is loosely fitted in the long hole 64a. Accordingly, when solenoid 67 is turned on, rotating lever 64 rotates in the clockwise direction to prevent the rotation of rotating plate 50, and the rack mount assumes a neutral state. When solenoid 67 is turned off, rotating lever 64 rotates in the counterclockwise direction, the rotating plate 50 rotates approximately 90°, and the rack mount assumes a retreat state or an advance state. The movement of the rack mount is performed in accordance with the sequence shown in FIG. 10, as in the foregoing embodiment.

In the above description, explanation has been provided of a case in which speeds in advance and retreat movements are changed using a two-staged pinion gear. However, when advance and retreat movements are to be performed with an identical speed, only one pinion gear is needed, and two rack gears may be arranged in one plane. Hence, a simpler configuration may be provided.

Although, in the present embodiment, reciprocating movement of an original mount for a copier or the like has been illustrated, the present embodiment may of course be applied to other devices performing reciprocating movement, such as a scanner for a printer, and the like.

Next, a fourth embodiment of the present invention will be explained.

Figure 19:
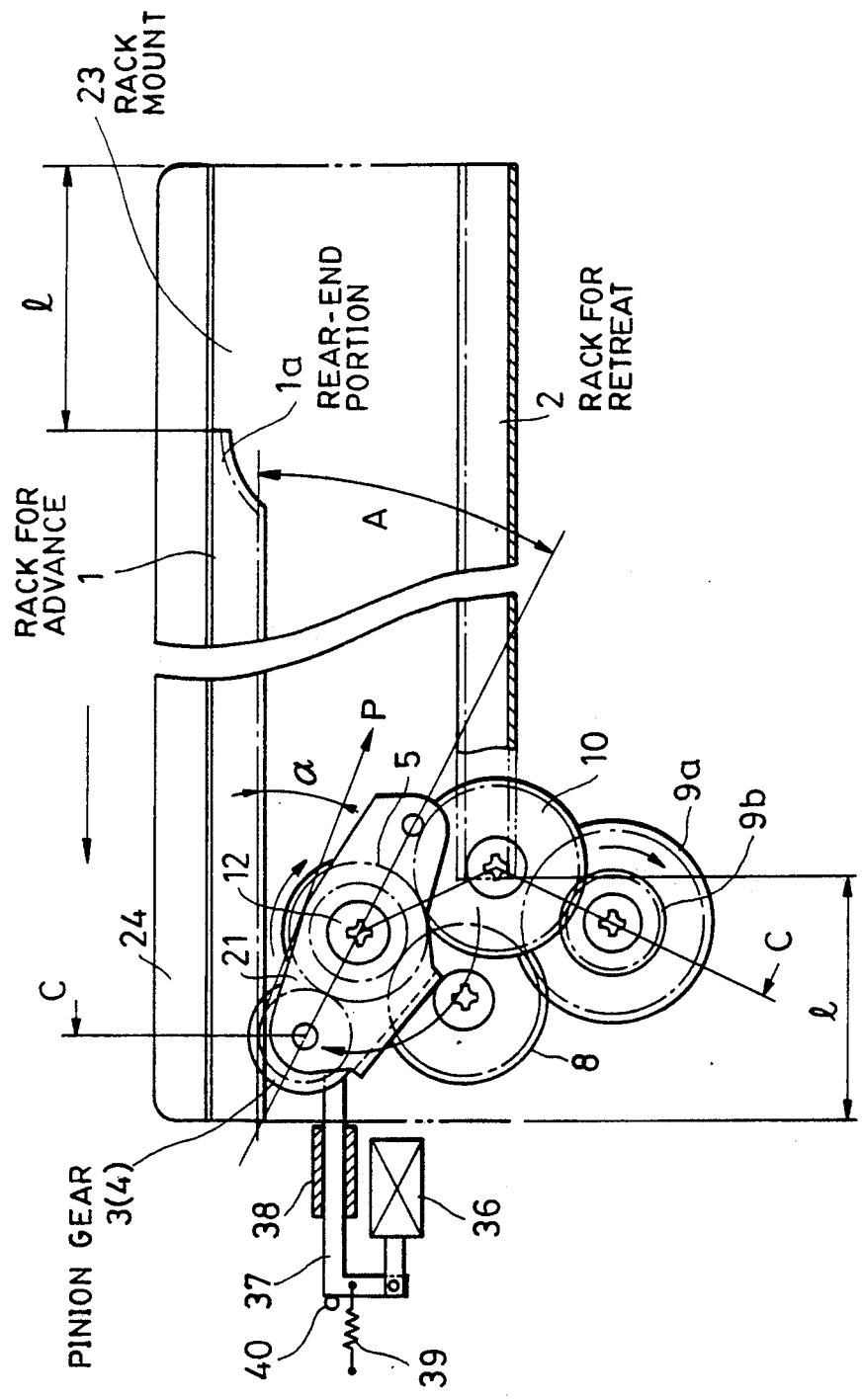
FIG. 19 is a diagram showing the configuration of an advance state of a device according to a fourth embodiment of the present invention.
Figure 20:
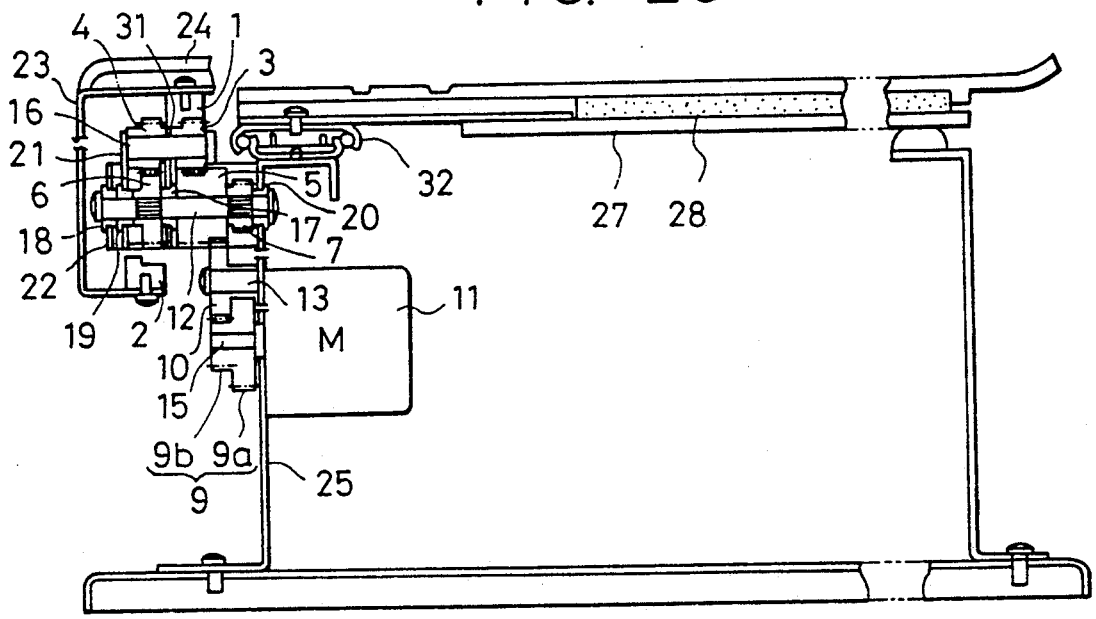
FIG. 20 is a diagram showing the state shown in FIG. 19, from direction C—C.
Figure 21:
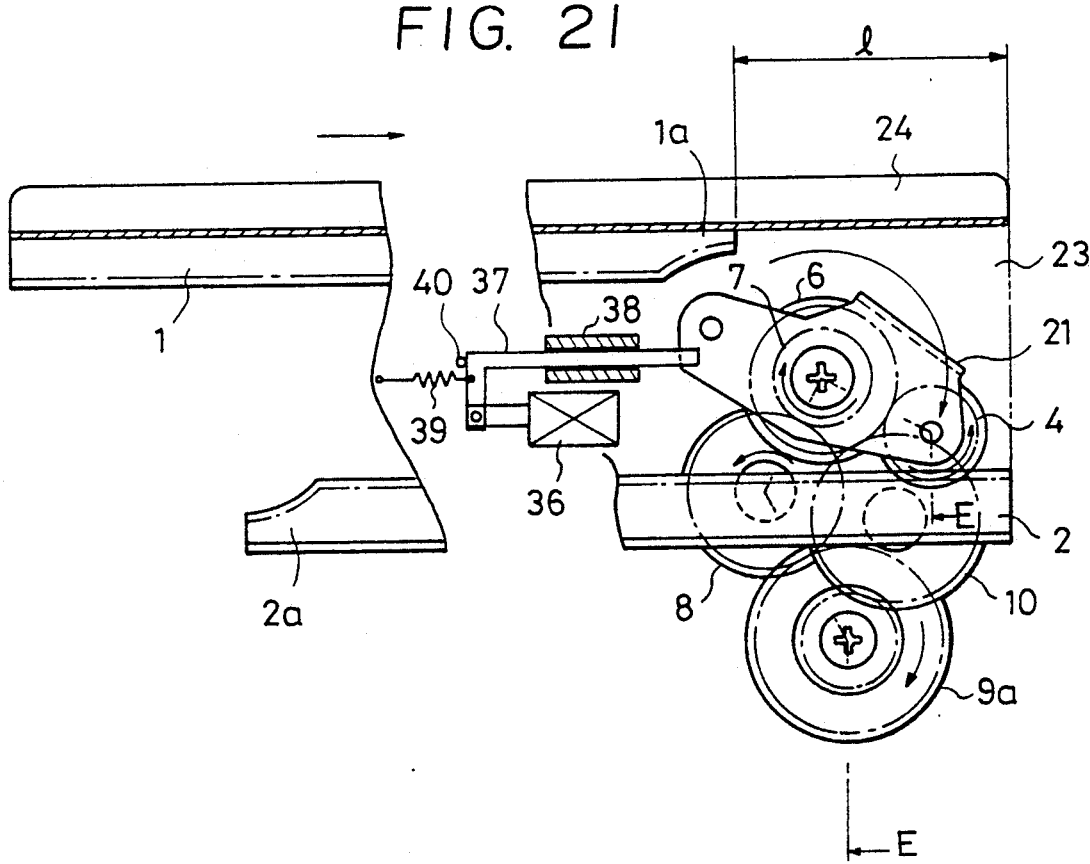
FIG. 21 is a diagram showing the configuration of a retreat state of the device of the fourth embodiment.
Figure 22:
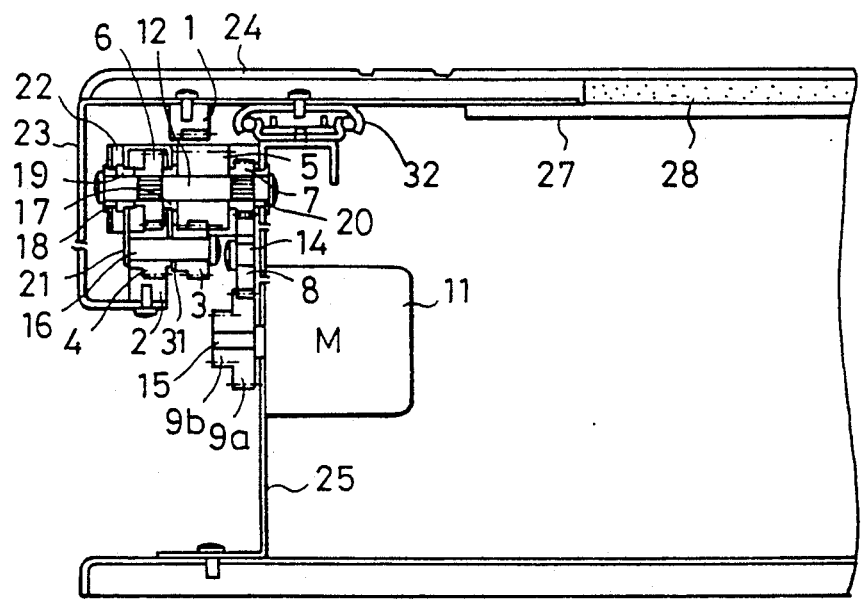
FIG. 22 is a diagram showing the state shown in FIG. 21, from direction E—E.

FIG. 19 represents a case in which a reciprocating driving device according to the fourth embodiment of the present invention is applied to a rack mount of a copier, and shows a state in which the rack mount is moving in the advance direction. FIG. 20 is a view of the device in the same state as seen from line C—C in FIG. 19. FIG. 21 shows a state in which the device is moving in the retreat direction. FIG. 22 is a view of the device in the same state as seen from line E—E in FIG. 21.

As is clearly shown in FIG. 20, in the copier of the present embodiment, the components of an original mount are composed of original-mount glass 27, and a pinion gear 3 for advance and a pinion gear 4 for retreat having different speeds and disposed parallel to each other. Pinion gear 3 for advance meshes with a rack 1 for advance during advance movement, as shown in FIGS. 19 and 20, and pinion gear 4 for retreat meshes with a rack 2 for retreat during retreat movement, as shown in FIGS. 21 and 22.

Since the mechanism and operation for this drive transmission are the same as in the above-described second embodiment, like components are indicated by like numerals, and an explanation thereof will be omitted.

Figure 23A:
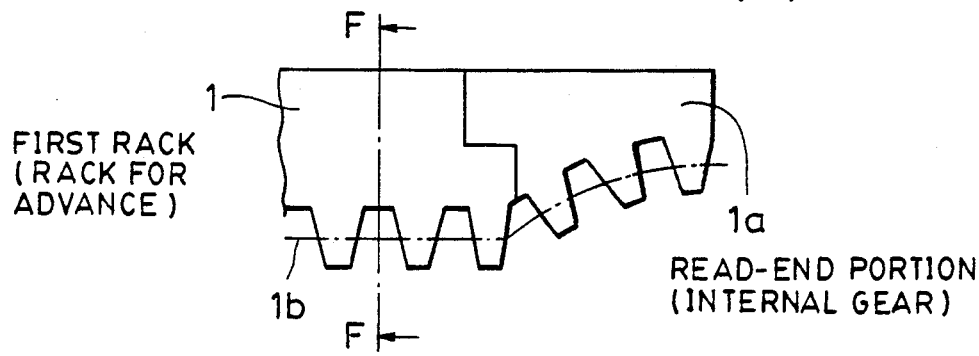
FIGS. 23(a) and 23(b) are a diagram showing an enlarged end portion of a rack.
Figure 23B:
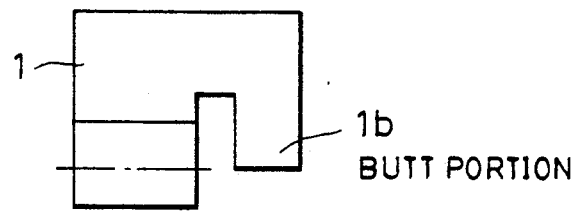

An explanation will now be provided of FIGS. 23(a) and 23(b), which most clearly show the characteristics of the present embodiment. FIG. 23(a) shows an enlarged rear-end portion 1a of rack 1 for advance shown in FIG. 19. In FIG. 23(a), the right rear-end portion 1a of rack 1 is formed as an internal gear, which is smoothly connected to a horizontal portion of rack 1. Accordingly, a supporting plate 21 can smoothly rotate when pinion gear 3 tries to leave the rack 1. The end portion 1a of rack 1 may be formed separated from rack 1, and may be assembled as one body when rack 1 is mounted on rack mount 23 as shown in FIG. 19.

As shown in FIG. 23(b), a butt portion 1b for preventing backlash relative to pinion gear 3 is formed at a side of the toothed-surface portion of rack 1. The right-end portion of the butt portion 1b has the shape of a circular arc as the right-end portion of rack 1. Although not illustrated, a butt roller contacting the butt portion 1b is rotatably provided on pinion gear 3 coaxially with pinion gear 3. As for rack 2, the left rear-end portion 2a is similarly formed, as shown in FIG. 21.

Rack 1 for advance and rack 2 for retreat are disposed so as to be shifted or offset from each other lengthwise by a predetermined distance l in order to secure a space so that the pinion gears 3 and 4 can revolve around shaft 12 at the rear-end side of each rack.

Figure 24:
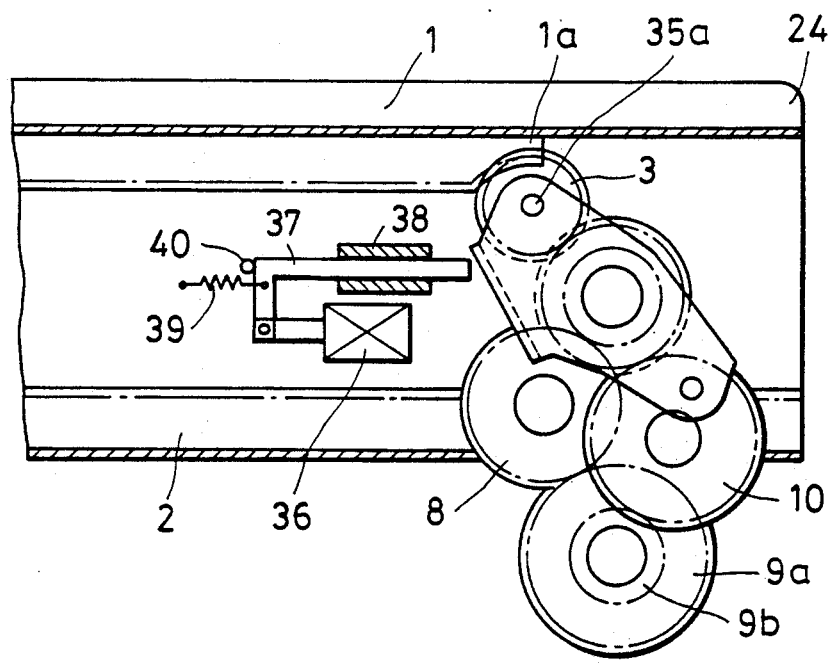
FIG. 24 is a diagram showing a state when a pinion gear starts to revolve at a rear-end portion of a rack.

When pinion gear 3 is driven in a state meshing with rack 1, the original mount moves together with the rack mount 23 in the direction of the arrow shown in FIG. 19. If the rack mount 23 continues to advance, pinion gear 3 reaches the right-end portion 1a of the rack 1 (see FIG. 24). Pinion gear 3, which has performed horizontal movement of the rack mount 23 while meshing with the horizontal portion of rack 1, starts its own revolution as well as performing the horizontal movement of the rack 23 when it has reached the right-end portion 1a of rack 1. Since the right-end portion 1a of rack 1 is formed in the shape of an internal gear, pinion gear 3 securely performs horizontal movement of rack 1 even upon reaching a border portion between the horizontal portion and the right-end portion 1a of rack 1, and meshes with the internal gear after it has meshed with the final horizontal portion of rack 1. Accordingly, when pinion gear 3 leaves the end portion of the horizontal portion of rack 1, the teeth of pinion gear 3 contact the teeth of the horizontal end-portion of rack 1, and pinion gear 3 securely revolves.

Similarly, in retreat movement, if the motor is rotated in a state in which pinion gear 4 meshes with rack 2, the original mount moves in the direction of the arrow shown in FIG. 21.

Rack mount 23 continues retreat movement, and pinion gear 4 for retreat reaches a left-end portion 2a of rack 2 for retreat. Since the left-end portion 2a of rack 2 for retreat is formed in the shape of an internal gear, like the right-end portion 1a of rack 1 for advance, pinion gear 4 securely rotates in the clockwise direction to mesh with rack 1 for advance, and rack mount 23 is switched to advance movement.

Accordingly, in either advance or retreat movement, the pinion gear securely leaves the end portion of the rack, and smooth switching is performed.

Figure 25:
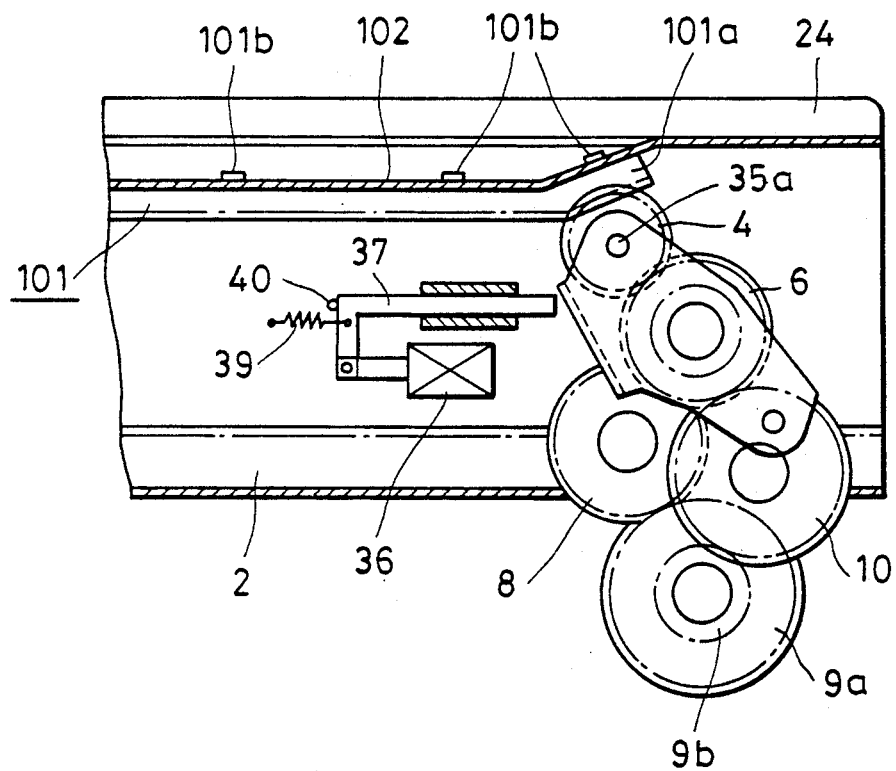
FIG. 25 is a diagram showing a fifth embodiment of the present invention.

FIG. 25 shows a reciprocating driving device according to a fifth embodiment of the present invention. An explanation will be provided while indicating like components as those in the above-described fourth embodiment by like numerals.

The rack mounting surface of a rack mount 102 is formed as a horizontal surface, but the portion of that surface contacting a right-end portion 101a of a rack 101 for advance is sloped upward to the right. Holes (not shown) for inserting pawls or projections 101b provided on the rack 101 are formed on the rack mounting surface of rack mount 102. Pawls 101b are inserted into the holes to mount rack 101 on rack mount 102 as one body. The right-end portion 101a of rack 101 has a slanting surface rising to the right conforming to the sloped portion of rack mount 102 so that the rack 101 can be mounted on the rack mount 102. The sloped right-end portion 101a is bent in a direction away from gear 6. The angle of the slope may be chosen arbitrarily. In order to effectively function for performing horizontal movement of rack mount 24, it is preferred to provide a slope so that the right end F of the right-end portion 101a meshes with pinion gear 4 when pinion gear 4 is at its uppermost position (in a vertical state). Although not illustrated, a rack for retreat is formed in the same manner.

As described above, according to the present embodiment also, switching from an advance state to a retreat state and the reverse switching are smoothly performed as in the above-described fourth embodiment.

Figure 26A:
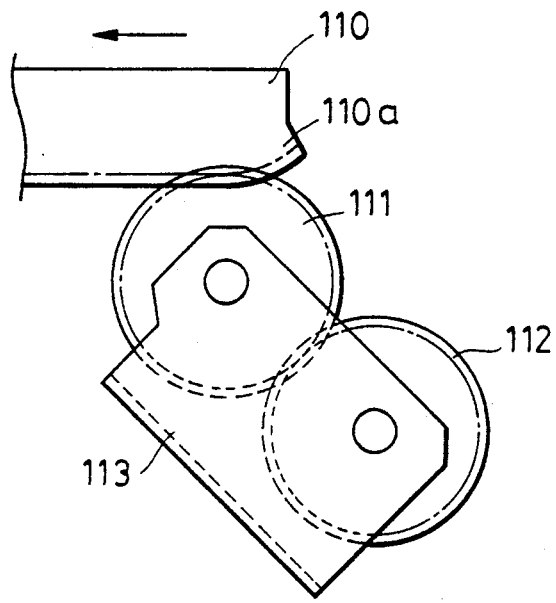
FIGS. 26(a), 26(b) and 26(c) are a diagram showing a sixth embodiment of the present invention.
Figure 26B:
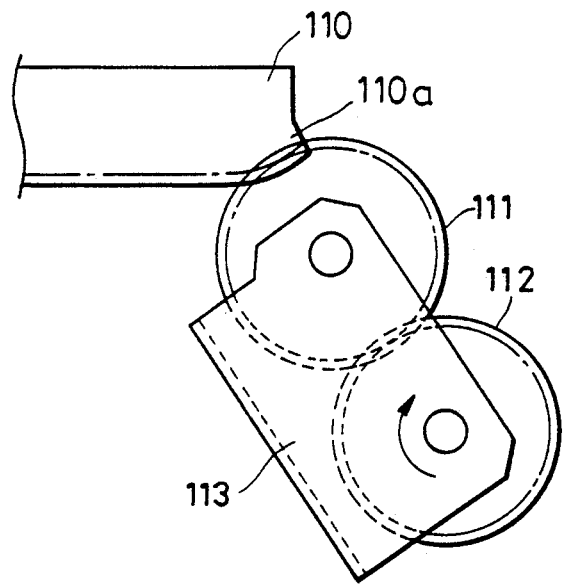
Figure 26C:
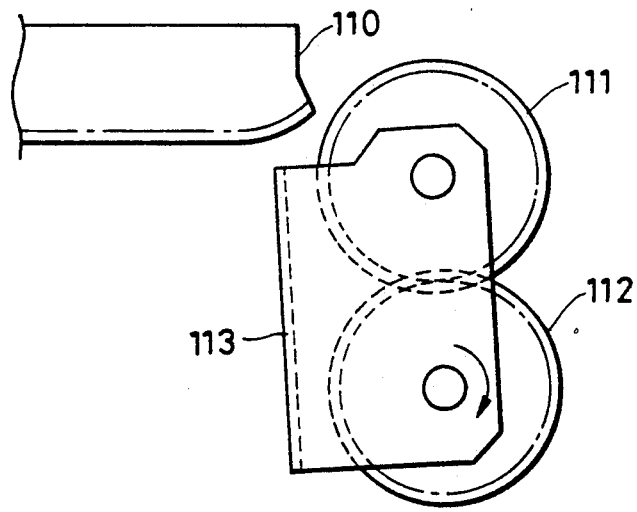

FIGS. 26(a)-26(c) represent a sixth embodiment of the present invention, wherein the rear-end portion of a rack is formed in the shape of a circular arc. Since the basic configuration is the same as that of the foregoing fourth embodiment, only characteristic portions are shown, in enlarged views.

As shown in FIG. 26(a), a rack 110 is mounted on a rack mount (not shown) as in the foregoing embodiment, and is arranged so as to be subjected to horizontal movement in the direction of the arrow, while meshing with a pinion gear 111. A gear 112 and a supporting plate 113 are configured in the same manner as in the foregoing embodiment. A right-end portion 110a (including a butt portion) of rack 110 has the shape of a circular arc bent in a direction away from gear 112. As shown in FIG. 26(b), if rack 110 moves in the direction of the arrow in FIG. 26(a) and pinion gear 111 meshes with the right-end portion 110a, supporting plate 113 starts to rotate in the clockwise direction. While the supporting plate 113 is rotating in the clockwise direction, rack 110 is moved in the direction of the arrow by pinion gear 111. If pinion gear 111 further rotates to continue the rotation of supporting plate 113, pinion gear 111 leaves the rack 110, as shown in FIG. 26(c), and meshes with another rack (not shown) at the opposite side. Subsequently, the original mount moves in a direction opposite to the arrow. As in the foregoing fourth and fifth embodiments, in the present embodiment also, switching from one rack to the other rack is smoothly performed.

FIG. 27 illustrates a copier to which one of the mechanisms for performing reciprocating movement of an original mount shown in the foregoing first through sixth embodiments can be applied.

In FIG. 27, any of the mechanisms of the foregoing first through sixth embodiments is applied to original-mount glass 27 made of a transparent member having an original-mounting portion and capable of performing reciprocating movement in the directions of the horizontal two-headed arrow. A focusing light transmitter 202 performs slit exposure of an image of an original placed on the original-mount glass 27 onto a photosensitive drum 203 rotating in the direction of the curved arrow. A charger 204 uniformly charges the photosensitive drum 203. An electrostatic latent image of the original is formed on the uniformly charged photosensitive drum 203 by the focusing light transmitter 202, and is developed by a developing unit 205. Transfer paper P is fed onto the drum 203 by a register roller 207 rotating with a timing so as to synchronize with a paper-feed roller 206 and the image on photosensitive drum 203. The image on drum 203 is then transferred to transfer paper P by a transfer charger 208. Subsequently, transfer paper P is separated from the drum 203 by a separation means, and is guided by a guide 209. The toner image on the transfer paper P is then fixed by a fixing unit 210. Subsequently, transfer paper P is conveyed by a discharge roller 211, and is discharged onto a tray 212.

What is claimed is:

1. A reciprocating driving device comprising:
   a reciprocating moving member supported to be movable in a predetermined direction and the opposite direction;
   a first rack provided on said reciprocating moving member;
   a second rack provided on said reciprocating moving member; and
   moving gear means for selectively moving said reciprocating moving member in the predetermined direction or the opposite direction by rotating in a predetermined first rotational direction and selectively meshing with said first rack or said second rack.

2. A reciprocating driving device according to claim 1, wherein said reciprocating moving member further comprises a mount for an original.

3. A reciprocating driving device according to claim 1, wherein said first rack comprises first teeth and said second rack comprises second teeth, and wherein said first teeth of said first rack are arranged so as to face said second teeth of said second rack.

4. A reciprocating driving device according to claim 1, further comprising:
   second rotating gear means for rotating in a predetermined second rotational direction; and
   supporting means for supporting said moving gear means so as to be revolvable around said second rotating gear means while meshing with said second rotating gear means.

5. A reciprocating driving device according to claim 4, wherein said moving gear means moves said reciprocating moving member while meshing with said first rack, and wherein, after said moving gear detaches from an end portion of said first rack, said moving gear means revolves around said second rotating gear means until said moving gear means meshes with said second rack.

6. A reciprocating driving device according to claim 5, wherein said first rack is shaped so that said moving gear means separates from said first rack in proximity of said end portion of said first rack.

7. A reciprocating driving device according to claim 5, wherein said moving gear means moves said reciprocating moving member while meshing with said second rack, and wherein, after said moving gear means detaches from an end portion of said second rack, said moving gear means revolves around said second rotating gear until said moving gear means meshes with said first rack.

8. A reciprocating driving device according to claim 7, wherein said second rack is shaped so that said moving gear means separates from said second rack in proximity of said end portion of said second rack.

9. A reciprocating driving device according to claim 5, further comprising prevention means for preventing said moving gear means from revolving around said second rotating gear means.

10. A reciprocating driving device according to claim 9, wherein said prevention means prevents revolution in a state in which said moving gear means is separated from both said first rack and said second rack.

11. A reciprocating driving device according to claim 1, wherein said moving gear means alternately moves said reciprocating moving member in the predetermined direction and the opposite direction by alternately meshing with said first rack and with said second rack.

12. A reciprocating driving device according to claim 1, wherein said moving gear means comprises a gear.

13. A reciprocating driving device according to claim 1, wherein said moving gear means comprises a first gear meshing with said first rack and a second gear meshing with said second rack.

14. A reciprocating driving device comprising:
    a reciprocating moving member supported to be movable in a predetermined first direction and a second direction opposite to the first direction;
    a first rack provided on said reciprocating moving member;
    a second rack provided on said reciprocating moving member;
    first gear means for moving said reciprocating moving member selectively in the first or second direction by rotating in a predetermined first rotational direction and selectively meshing with said first rack or with said second rack;
    second gear means mounted for rotating in a predetermined second rotational direction; and
    supporting means for supporting said first gear means so as that said first gear means revolves around said second gear means while meshing with said second gear means;
    wherein said first gear means moves said reciprocating moving member in the first direction while meshing with said first rack, wherein, after said first gear means detaches from an end portion of said first rack, said first gear means revolves around said second gear means until said first gear means meshes with said second rack, wherein said first gear means moves said reciprocating moving member in the second direction while meshing with said second rack, and wherein, after said first gear means detaches from an end portion of said second rack, said first gear means revolves around said second gear means until said first gear means meshes with said first rack.

15. A reciprocating driving device according to claim 14, wherein said reciprocating moving member further comprises a mount for an original.

16. A reciprocating driving device according to claim 14, wherein said first and second racks are shaped so that respective ends of said first and second racks separate from said first gear means when said first gear means is detached.

17. A reciprocating driving device according to claim 14, further comprising prevention means for preventing said first gear means from revolving around second gear means.

18. A reciprocating driving device according to claim 17, wherein said prevention means prevents revolution in a state in which said first gear means is separated from said first rack and said second rack.

19. A reciprocating driving device according to claim 14, wherein said first gear means comprises a gear.

20. A reciprocating driving device according to claim 14, wherein said first gear means comprises a first gear meshing with said first rack and a second gear meshing with said second rack.

21. An image forming apparatus comprising:
an original mount for mounting an original supported to be movable in a predetermined first direction and a second direction opposite to the first direction;
a first rack provided on said original mount;
a second rack provided in said original mount;
first gear means for selectively moving said original mount in the first or the second direction by rotating in a predetermined first rotational direction and selectively meshing with said first rack or said second rack;
second gear means rotating in a predetermined second rotational direction;
supporting means for supporting said first gear means so that said first gear means is revolvable around said second gear means while meshing with said second gear;
mounting means for mounting a sheet;
feed means for feeding the sheet mounted on said mounting means;
exposure means for sequentially exposing an image of an original mounted on said original mount in accordance with the movement of said original mount in the first direction; and
image forming means for forming the image of the original exposed by said exposure means onto the sheet fed by said feed means,
wherein said first gear means moves said original mount in the first direction while meshing with said first rack, wherein, after said first gears means detaches from an end portion of said first rack, said first gear means revolves around said second gear means until said first gear means meshes with said second rack, wherein said first gear means moves said original mount in the second direction while meshing with said second rack, and wherein after said first gear means detaches from an end portion of said second rack, said first gear means revolves around said second gear means until it meshes with said first rack.

22. An image forming apparatus according to claim 21, further comprising prevention means for preventing said first gear means from revolving around said second gear means, and wherein said prevention means prevents revolution in a state in which said first gear means is separated from said first rack and said second rack.

23. An image forming apparatus according to claim 22, further comprising control means for controlling said prevention means so as to prevent revolution of said first gear means by said prevention means before said first gear meshes with said first rack after separating from said second rack.

24. An image forming apparatus according to claim 21, wherein said first gear means comprises a gear.

25. An image forming apparatus according to claim 21, wherein said first gear means comprises a first gear meshing with said first rack and a second gear meshing with said second rack.

26. An image reading apparatus comprising:
an original mount for mounting an original supported to be movable in a predetermined first direction and a second direction opposite to the first direction;
a first rack provided on said original mount;
a second rack provided on said original mount;
gear means for selectively moving said original mount in the first direction or the second direction by rotating in a predetermined rotational direction and selectively meshing with said first rack or said second rack;
image reading means for reading the image of the original mounted in moving said original mount.

27. An image reading apparatus according to claim 26, wherein said gear means comprises a gear.

28. An image reading apparatus according to claim 26, wherein said first gear means comprises a first gear meshing with said first rack and a second gear meshing with said second rack.

29. An image reading apparatus according to claim 26, further comprising:
second gear means rotating in a predetermined second rotational direction;
supporting means for supporting said first gear means so that said first gear means are revolvable around said second gear means while meshing with said second gear.

* * * * *

UNITED STATES PATENT AND TRADEMARK OFFICE
CERTIFICATE OF CORRECTION

PATENT NO. : 5,113,224
DATED : May 12, 1992
INVENTOR(S) : TADAYUKI TSUDA, ET AL.

It is certified that error appears in the above-identified patent and that said Letters Patent is hereby corrected as shown below: In the Drawings:

SHEET 10 OF 18

FIG. 16B, "ORIGNAL" should read --ORIGINAL--.

COLUMN 1

Line 41, "are combined" should be deleted.

COLUMN 2

Line 18, "parellel" should read --parallel--.

COLUMN 4

Line 1, "parellel," should read --parallel,--.
Line 65, "the" (first occurrence) should read --and the--.

COLUMN 5
Line 52:
TABLE 1, "12)" should be deleted.

COLUMN 7

Line 20, "mesh" should read --mesh with--.

COLUMN 8

Line 13, "situated" should read --is situated--.
Line 35, "detects" should read --detecting--.

COLUMN 15

Line 36, "gears" should read --gear--.

UNITED STATES PATENT AND TRADEMARK OFFICE
CERTIFICATE OF CORRECTION

PATENT NO. : 5,113,224

DATED : May 12, 1992

INVENTOR(S) : TADAYUKI TSUDA, ET AL.

Page 2 of 2

It is certified that error appears in the above-identified patent and that said Letters Patent is hereby corrected as shown below:

COLUMN 16

Line 30, "rack;" should read --rack; and--.
Line 42, "direction;" shoul dread --direction; and--.

Signed and Sealed this

Tenth Day of August, 1993

Attest:

MICHAEL K. KIRK

Attesting Officer

Acting Commissioner of Patents and Trademarks